(12) United States Patent
Kashiwagi et al.

(10) Patent No.: US 11,520,054 B2
(45) Date of Patent: Dec. 6, 2022

(54) POSITION MEASURING SYSTEM, POSITION MEASURING METHOD, AND NON-TRANSITORY PROGRAM RECORDING MEDIUM

(71) Applicant: NEC Solution Innovators, Ltd., Tokyo (JP)

(72) Inventors: Maho Kashiwagi, Tokyo (JP); Ryo Miyamoto, Tokyo (JP); Yuka Kanda, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 564 days.

(21) Appl. No.: 16/487,487

(22) PCT Filed: Mar. 7, 2018

(86) PCT No.: PCT/JP2018/008692
§ 371 (c)(1),
(2) Date: Aug. 21, 2019

(87) PCT Pub. No.: WO2018/168594
PCT Pub. Date: Sep. 20, 2018

(65) Prior Publication Data
US 2020/0057162 A1   Feb. 20, 2020

(30) Foreign Application Priority Data
Mar. 13, 2017   (JP) .............................. JP2017-046942

(51) Int. Cl.
*G01S 19/07* (2010.01)
*H04B 7/185* (2006.01)

(52) U.S. Cl.
CPC ........ *G01S 19/073* (2019.08); *H04B 7/18521* (2013.01)

(58) Field of Classification Search
CPC ........... G01S 19/073–074; G01S 5/009; G01S 5/0236; H04W 36/32
See application file for complete search history.

(56) References Cited

U.S. PATENT DOCUMENTS

| 6,931,248 B2 * | 8/2005 | Borel ................ H04B 7/18506 |
| | | 455/431 |
| 9,351,224 B2 * | 5/2016 | Zhou .................... H04W 36/32 |

(Continued)

FOREIGN PATENT DOCUMENTS

| JP | 2002-040122 A | 2/2002 |
| JP | 2003-090873 A | 3/2003 |

(Continued)

OTHER PUBLICATIONS

International Search Report for PCT Application No. PCT/JP2018/008692, dated Jun. 5, 2018.

(Continued)

*Primary Examiner* — Cassi J Galt
(74) *Attorney, Agent, or Firm* — Sughrue Mion, PLLC

(57) ABSTRACT

A position measuring system includes: a connection destination candidate selecting unit which selects a connection destination candidate for each of a plurality of route coordinates on a route included in route information, on the basis of the distance between each of the plurality of route coordinates and reference stations included in a reference station list; and a connection destination information generating unit which determines a connection destination for which to acquire the correction information, on the basis of prescribed determining criteria, from among the connection destination candidates selected by the connection destination candidate selecting means, and generates and outputs connection destination information relating to the determined connection destination.

13 Claims, 28 Drawing Sheets

(56) References Cited

U.S. PATENT DOCUMENTS

| | | | |
|---|---|---|---|
| 9,671,500 B1* | 6/2017 | Hay | G01S 19/07 |
| 10,149,223 B2* | 12/2018 | Guo | H04W 72/048 |
| 10,304,343 B2* | 5/2019 | Mustafic | G08G 5/0034 |
| 10,393,882 B2* | 8/2019 | Dai | G01S 19/29 |
| 10,490,090 B2* | 11/2019 | Quiroz-Hernandez | G01C 21/20 |
| 10,605,926 B2* | 3/2020 | Lie | G01S 19/43 |
| 10,795,025 B2* | 10/2020 | Wang | G01S 19/04 |
| 2005/0101341 A1* | 5/2005 | Ogata | H04W 48/20 455/525 |

FOREIGN PATENT DOCUMENTS

| | | |
|---|---|---|
| JP | 5494107 B2 | 5/2014 |
| JP | 2016-206205 A | 12/2016 |

OTHER PUBLICATIONS

English translation of Written opinion for PCT Application No. PCT/JP2018/008692.

* cited by examiner

Fig.9

121 REFERENCE STATION LIST

| STATION NUMBER | REFERENCE STATION COORDINATE | |
|---|---|---|
| | LONGITUDE (deg) | LATITUDE (deg) |
| 1 | 35.AAAAAA | 139.aaaaaa |
| 2 | 35.BBBBBB | 139.bbbbbb |
| 3 | 35.CCCCCC | 139.cccccc |
| ... | ... | ... |

Fig.10

122 REFERENCE STATION LIST

| STATION NUMBER | REFERENCE STATION COORDINATE | | AREA INFORMATION |
|---|---|---|---|
| | LONGITUDE (deg) | LATITUDE (deg) | |
| 1 | 35.AAAAAA | 139.aaaaaa | AREA A |
| 2 | 35.BBBBBB | 139.bbbbbb | AREA A |
| 3 | 35.CCCCCC | 139.cccccc | AREA B |
| ... | ... | ... | ... |

Fig.11

151 CONNECTION DESTINATION CANDIDATE LIST

| ROUTE COORDINATE | COUNT | STATION NUMBER | | |
|---|---|---|---|---|
| R1 | 3 | 1 | 2 | 3 |
| R2 | 3 | 1 | 2 | 3 |
| R3 | 2 | 1 | 2 | — |
| ... | ... | ... | ... | ... |
| R100 | 1 | 1 | — | — |

Fig.12

152 CONNECTION DESTINATION CANDIDATE LIST

| ROUTE COORDINATE | COUNT | STATION NUMBER | | |
|---|---|---|---|---|
| R1 | 3 | 1 | 2 | 3 |
| R2 | 3 | 1 | 2 | 3 |
| R3 | 3 | 1 | 2 | 4 |
| ... | ... | ... | ... | ... |
| R100 | 3 | 1 | 4 | 5 |

Fig.16

342 DETERMINATION CONDITION LIST

| STATION NUMBER | DETERMINATION CONDITION VALUE | | | DETERMINATION VALUE |
|---|---|---|---|---|
| | COMMUNICATION CONDITION VALUE | DISTANCE CONDITION VALUE | VALID PERIOD CONDITION VALUE | |
| 1 | 1 | 2.5 | 20 | 1.25 |
| 2 | 1 | 5.0 | 10 | 5.0 |
| 3 | 0 | 7.5 | 50 | 0 |
| ... | ... | ... | ... | ... |

Fig.20

343 DETERMINATION CONDITION LIST

| STATION NUMBER | DETERMINATION CONDITION VALUE ||||| DETERMINATION VALUE |
| | COMMUNICATION CONDITION VALUE | DISTANCE CONDITION VALUE | VALID PERIOD CONDITION VALUE | CORRECTION INFORMATION QUALITY CONDITION VALUE | |
|---|---|---|---|---|---|
| 1 | 1 | 2.5 | 20 | 2 | 2.5 |
| 2 | 1 | 5.0 | 10 | 1 | 5.0 |
| 3 | 0 | 7.5 | 50 | 2 | 0 |
| ... | ... | ... | ... | ... | ... |

Fig.22

| STATION NUMBER | REFERENCE STATION COORDINATE || EQUIPMENT MAKER |
| --- | --- | --- | --- |
| | LONGITUDE (deg) | LATITUDE (deg) | |
| 1 | 35.AAAAAA | 139.aaaaaa | COMPANY A |
| 2 | 35.BBBBBB | 139.bbbbbb | COMPANY B |
| 3 | 35.CCCCCC | 139.cccccc | COMPANY C |
| ... | ... | ... | ... |

124 REFERENCE STATION LIST

Fig.23

344 DETERMINATION CONDITION LIST

| STATION NUMBER | DETERMINATION CONDITION VALUE | | | | | DETERMINATION VALUE |
|---|---|---|---|---|---|---|
| | COMMUNICATION CONDITION VALUE | DISTANCE CONDITION VALUE | VALID PERIOD CONDITION VALUE | CORRECTION INFORMATION QUALITY CONDITION VALUE | DEVICE CONDITION VALUE | |
| 1 | 1 | 2.5 | 20 | 2 | 1 | 2.5 |
| 2 | 1 | 5.0 | 10 | 1 | 2 | 10 |
| 3 | 0 | 7.5 | 50 | 2 | 2 | 0 |
| ... | ... | ... | ... | ... | ... | ... |

POSITION MEASURING SYSTEM, POSITION MEASURING METHOD, AND NON-TRANSITORY PROGRAM RECORDING MEDIUM

This application is a National Stage Entry of PCT/JP2018/008692 filed on Mar. 7, 2018, which claims priority from Japanese Patent Application 2017-046942 filed on Mar. 13, 2017, the contents of all of which are incorporated herein by reference, in their entirety.

TECHNICAL FIELD

The present invention relates to a position measuring system, a position measuring method, and a program which correct, by correction information, position information being calculated from positioning information transmitted from an artificial satellite.

BACKGROUND ART

A position can be determined with a 10-meter-unit error by a global navigation satellite system such as a global positioning system (GPS), a global navigation satellite system (GLONASS), Galileo, or a quasi-zenith satellite.

PTL 1 discloses a position measuring device which measures a position by receiving positioning information transmitted by an artificial satellite, and correction information generated based on information on an electronic reference point (hereinafter, referred to as a reference station) and distributed.

The device of PTL 1 calculates a traveling position of a moving body by use of observation data observed from a GPS satellite while the moving body being mounted with a GPS is traveling in a receivable area of correction information relating to measurement included in each of a plurality of reference stations, and correction information included in each of a plurality of reference stations. The device of PTL 1 sets a specified reference station, based on a distance to which a hysteresis value is added, and performs calculation of a position of a moving body, based on correction information included in the specified reference station, and observation data. The device of PTL 1 can determine a position with a centimeter-unit error.

CITATION LIST

Patent Literature

[PTL 1] Japanese Patent No. 5494107

SUMMARY OF INVENTION

Technical Problem

The above-described device of PTL 1 sets a specified reference station, based on a distance to which a hysteresis value is added. Thus, the device of PTL 1 has a problem that an optimal specified reference station is not set in such a case where a communication environment rapidly changes, and the device is unable to calculate position information with high accuracy.

In order to solve the above-described problem, an object of the present invention is to provide a position measuring system which determines an optimal reference station according to circumstances, and calculates highly accurate position information, based on correction information of the determined reference station.

Solution to Problem

A position measuring system in one aspect of the present invention includes: a connection destination candidate selecting unit which selects a connection destination candidate for each of a plurality of route coordinates, based on a distance between each of the plurality of route coordinates on a route included in route information and each reference station included in a reference station list; and a connection destination information generating unit which determines a connection destination for which correction information is acquired, based on a predetermined determination condition, from among the connection destination candidates selected by the connection destination candidate selecting unit, and generates and then outputs connection destination information relating to the determined connection destination.

A method in one aspect of the present invention includes: selecting a connection destination candidate for each of a plurality of route coordinates, based on a distance between each of the plurality of route coordinates on a route included in route information and each reference station included in a reference station list; determining a connection destination for which correction information is acquired, based on a predetermined determination condition, from among the selected connection destination candidates; generating connection destination information relating to the determined connection destination; and outputting the generated connection destination information.

A program in one aspect of the present invention causes a computer to execute: processing of selecting a connection destination candidate for each of a plurality of route coordinates, based on a distance between each of the plurality of route coordinates on a route included in route information and each reference station included in a reference station list; processing of determining a connection destination for which correction information is acquired, based on a predetermined determination condition, from among the selected connection destination candidates; processing of generating connection destination information relating to the determined connection destination; and processing of outputting the generated connection destination information.

Advantageous Effects of Invention

The present invention is able to provide a position measuring system which determines an optimal reference station according to circumstances, and calculates highly accurate position information, based on correction information of the determined reference station.

BRIEF DESCRIPTION OF DRAWINGS

FIG. 9 is a conceptual diagram illustrating one example of a reference station list stored in a reference station list storage of a connection destination determination device provided in the position measuring system according to the second example embodiment of the present invention.

FIG. 10 is a conceptual diagram illustrating another example of a reference station list stored in a reference station list storage of a connection destination determination device provided in the position measuring system according to the second example embodiment of the present invention.

FIG. 11 is a conceptual diagram illustrating one example of a connection destination candidate list stored in a connection destination candidate list storage of the connection destination determination device provided in the position measuring system according to the second example embodiment of the present invention.

FIG. 12 is a conceptual diagram illustrating an update example of a connection destination candidate list stored in the connection destination candidate list storage of the connection destination determination device provided in the position measuring system according to the second example embodiment of the present invention.

FIG. 16 is a conceptual diagram illustrating one example of a determination condition list collecting determination condition values generated by the connection destination calculating unit included in the connection destination information generating unit of the connection destination determination device provided in the position measuring system according to the second example embodiment of the present invention.

FIG. 20 is a conceptual diagram illustrating one example of a determination condition list collecting determination condition values generated by the connection destination calculating unit included in the connection destination information generating unit of the connection destination determination device provided in the position measuring system according to the third example embodiment of the present invention.

FIG. 22 is a conceptual diagram illustrating one example of a reference station list stored in a reference station list storage of the connection destination determination device provided in the position measuring system according to the fourth example embodiment of the present invention.

FIG. 23 is a conceptual diagram illustrating one example of a determination condition list collecting determination condition values generated by the connection destination calculating unit included in the connection destination information generating unit of the connection destination determination device provided in the position measuring system according to the fourth example embodiment of the present invention.

EXAMPLE EMBODIMENT

Figure 1:
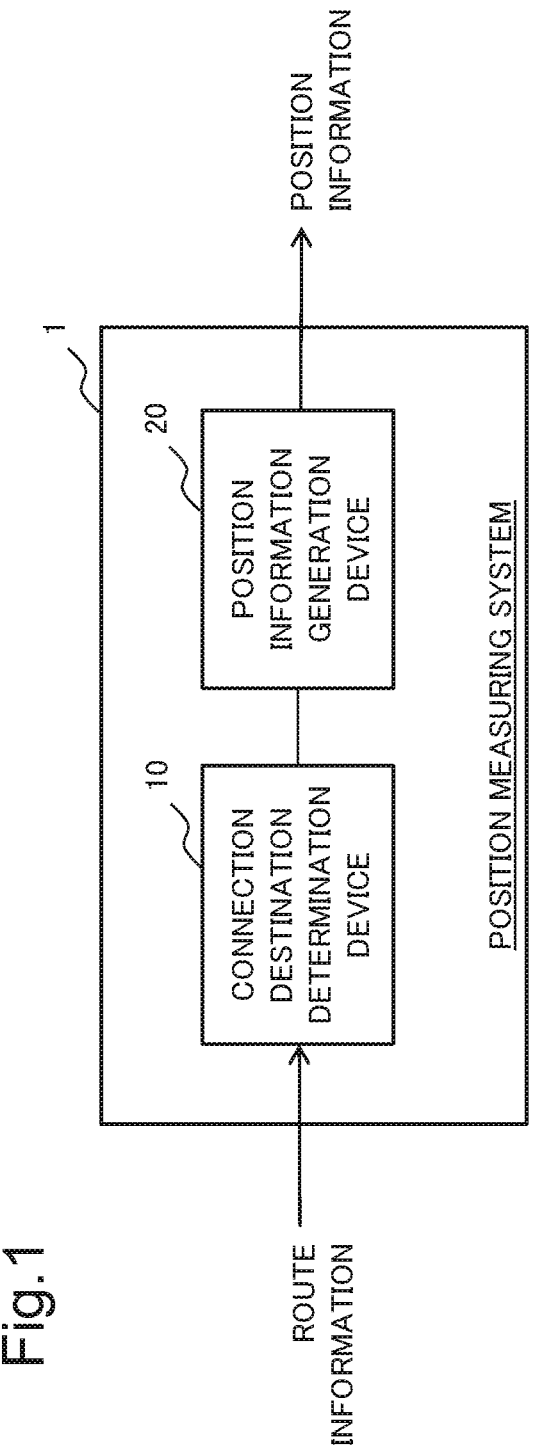
FIG. 1 is a block diagram illustrating a configuration of a position measuring system according to a first example embodiment of the present invention.

Example embodiments of the present invention will be described below by use of the drawings. However, technically preferable limitation is given to the example embodiments described below in order to implement the present invention, but does not limit the scope of the invention to the following. Note that, unless there is particularly a reason, a same reference sign is assigned to a similar part in all the drawings used for the description of the example embodiments below. Moreover, in the example embodiments below, a repeated description may be omitted in relation to a similar configuration or operation.

First Example Embodiment

A position measuring system according to a first example embodiment of the present invention is described with reference to the drawings.

The position measuring system according to the present example embodiment is connected to a navigation system which is mounted on a moving body, and which performs route guidance to a current position of the moving body and a destination. For example, when a moving body is an automobile, the position measuring system according to the present example embodiment may be connected to a car navigation system.

The position measuring system according to the present example embodiment measures a position by use of positioning information transmitted from an artificial satellite constituting a global navigation satellite system such as a global positioning system (GPS). The position measuring system according to the present example embodiment may acquire positioning information from a global navigation satellite system such as a global navigation satellite system (GLONASS), Galileo, or a quasi-zenith satellite, instead of the GPS.

The position measuring system according to the present example embodiment corrects position information calculated by precise point positioning (hereinafter PPP) using positioning information transmitted from an artificial satellite, with local correction information received from an electronic reference point. In the present example embodiment, it is assumed that local correction information provided by an electronic reference point is used. Note that a position measuring system 1 may correct positioning information by use of correction information other than local correction information provided by an electronic reference point.

Electronic reference points providing local correction information are currently disposed at approximately 1300 places in Japan. Correction information is generated based on satellite observation data received at an electronic reference point. In order to calculate highly accurate position information, it is required to use correction data generated at an optimal electronic reference point with reference to various conditions. An optimal electronic reference point changes at any time due to movement of a moving body, and therefore, is required to be selected each time. The position measuring system according to the present example embodiment selects an optimal reference station from among reference stations at approximately 1300 places at any time, and automatically switches a reference station which becomes a connection destination.

Note that, although a description is given in the present example embodiment assuming that correction information generated based on information on an electronic reference point is used, a generation source of correction information at a point other than an electronic reference point may be selected outside Japan. Moreover, even in Japan, correction information whose generation source is a point other than an electronic reference point may be used. Hereinafter, a generation source of correction information is referred to as a reference station.

According to PPP, precise positioning is possible without depending on a ground reference point, and a position can be determined with an error of about 10 centimeters. PPP has a problem of a convergence and taking time for initialization, but a time for initialization can be shortened by using local correction information obtained from an electronic reference point.

Configuration

Next, a configuration of a position measuring system according to the present example embodiment is described with reference to the drawings. FIG. 1 is a block diagram illustrating a configuration of the position measuring system 1 according to the present example embodiment. As in FIG. 1, the position measuring system 1 according to the present example embodiment includes a connection destination determination device 10 and a position information generation device 20.

The connection destination determination device 10 stores a list (hereinafter, a reference station list) collecting reference stations being generation sources of correction information used to correct position information calculated from positioning information transmitted from an artificial satellite.

Furthermore, the connection destination determination device 10 acquires route information from a departure location to a destination. For example, the connection destination determination device 10 acquires route information from a navigation system put in a moving body mounted with the position measuring system 1. Note that the connection destination determination device 10 may acquire route information from a source other than a navigation system put in a moving body.

The connection destination determination device 10 calculates a distance between each of a plurality of reference stations included in a reference station list, and a plurality of coordinates (hereinafter, route coordinates) on an acquired route, and selects a candidate (hereinafter, a connection destination candidate) of a reference station (hereinafter, a connection destination) to be connected as a generation source of correction information.

The connection destination determination device 10 determines a connection destination from among a selected connection destination candidate, based on a predetermined determination condition for determining a connection destination. For example, the connection destination determination device 10 determines a connection destination from among connection destination candidates, based on a magnitude relation of determination value calculated from a determination condition converted into a numerical value.

Determination conditions used when the connection destination determination device 10 determines a connection destination include at least two conditions below.

A first condition is a communication condition indicating whether or not network connection to a connection destination candidate is possible. A second condition is a distance condition indicated by a representing value of a distance between each of a plurality of relay locations set on a route, and a connection destination candidate.

Furthermore, determination conditions preferably include a valid period condition (a third condition) relating to a valid period of a current connection destination on a route being farther than a spot to be arrived at a predetermined time later (hereinafter, an estimated arrival location). Moreover, determination conditions may include correction information quality condition (a fourth condition) relating to quality of correction information generated from information on a reference station, and a device condition (a fifth condition) relating to a reception device which receives a signal from a satellite.

The connection destination determination device 10 outputs information (hereinafter, connection destination information) relating to a determined connection destination to the position information generation device 20.

The position information generation device 20 acquires positioning information transmitted from an artificial satellite. The position information generation device 20 preferably acquires positioning information transmitted from a plurality of artificial satellites. Moreover, the position information generation device 20 acquires connection destination information from the connection destination determination device 10, and acquires correction information for correcting positioning information from a reference station included in the connection destination information.

The position information generation device 20 calculates position information by use of positioning information received from an artificial satellite, and correction information acquired from a reference station.

When a predetermined time elapses, the position information generation device 20 determines whether or not the moving body has arrived at a destination. Herein, when the moving body has arrived at the destination, a series of processing ends. On the other hand, when the moving body has not arrived at the destination, the position information generation device 20 calculates position information at the spot by PPP. Then, when a distance between the spot and a connection destination is within a predetermined range, the position information generation device 20 outputs the calculated position information, and waits for a predetermined time. On the other hand, when a distance between the spot and a connection destination exceeds the predetermined range, the position information generation device 20 gives the connection destination determination device 10 an instruction to update the connection destination. Note that exchange of signals between the position information generation device 20 and the connection destination determination device 10 may be performed via a non-illustrated communication interface.

Reference Station

Figure 2:
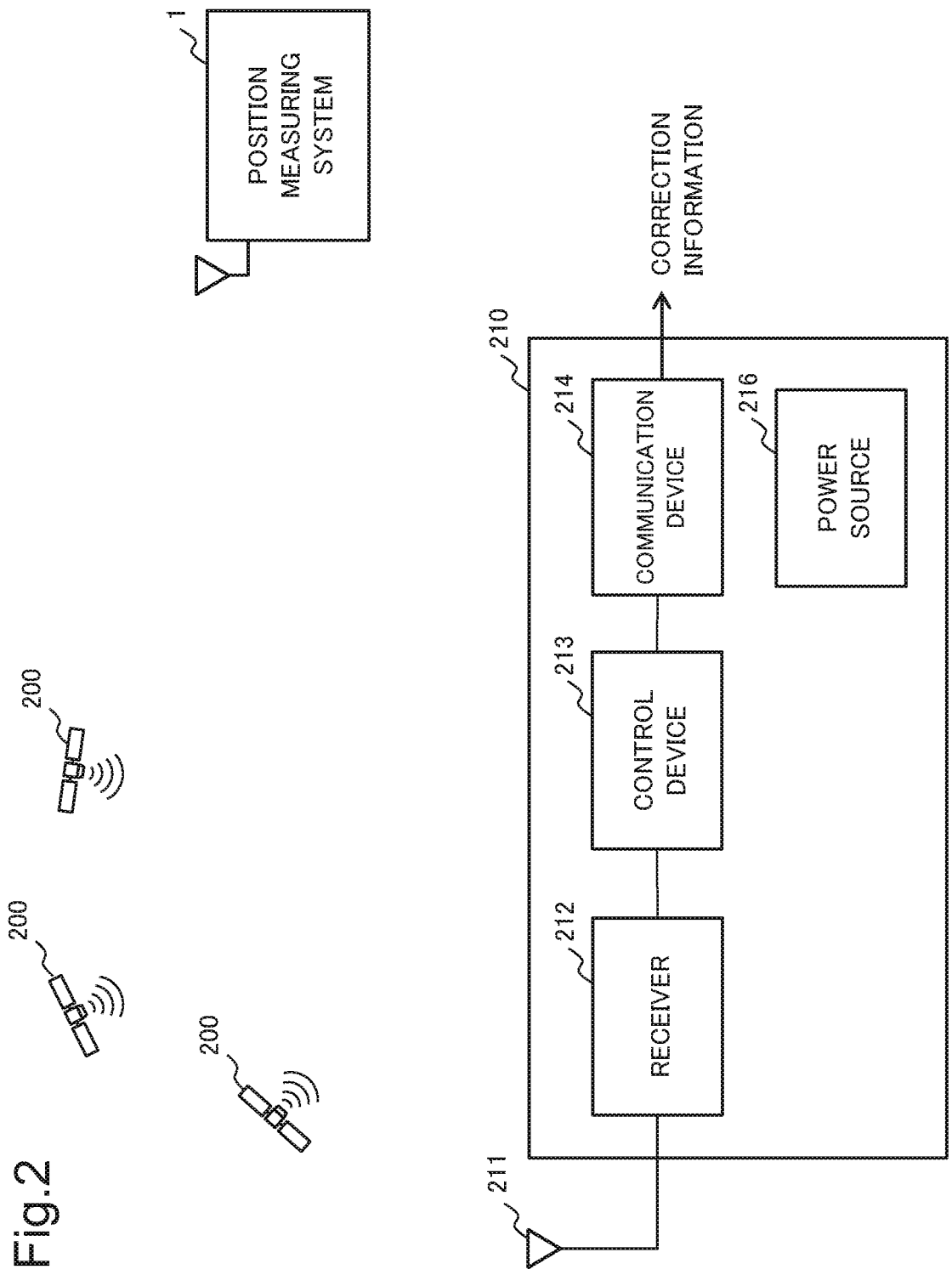
FIG. 2 is a conceptual diagram illustrating a configuration example of a reference station which becomes a connection destination of the position measuring system according to the first example embodiment of the present invention.

FIG. 2 is a conceptual diagram illustrating one example of a reference station 210 from which the position measuring system 1 according to the present example embodiment acquires correction information. A specific example of the reference station 210 is an electronic reference point.

The reference station 210 includes an antenna 211, a receiver 212, a control device 213, a communication device 214, and a power source 216.

The antenna 211 is an antenna for receiving a radio wave transmitted from an artificial satellite 200. The receiver 212 receives the radio wave transmitted from the artificial satellite 200 via the antenna 211, then demodulates a signal including positioning information of the artificial satellite 200, and outputs the demodulated signal to the control device 213.

The control device 213 inputs the signal including the positioning information transmitted from the artificial satellite 200, and generates correction information for correcting the positioning information. The control device 213 outputs the generated correction information to the communication device 214.

The communication device 214 converts the generated correction information into a radio signal, and transmits the radio signal via a network such as the Internet. The radio signal transmitted from the communication device 214 is received by the position measuring system 1.

The power source 216 is an electric power source which supplies electric power to the receiver 212, the control device 213, and the communication device 214.

In other words, the reference station 210 receives the radio wave transmitted from the artificial satellite 200, and then demodulates the signal including the positioning information of the artificial satellite 200. Then, the reference station 210 generates correction information for correcting the positioning information included in the demodulated signal, converts the generated correction information into a radio signal, and then transmits the radio signal. Note that the reference station 210 in FIG. 2 is one example, and does not limit a reference station according to the present example embodiment.

Operation

Next, an operation of the position measuring system 1 according to the present example embodiment is described with reference to the drawings.

Connection Destination Information Generation Processing

Figure 3:
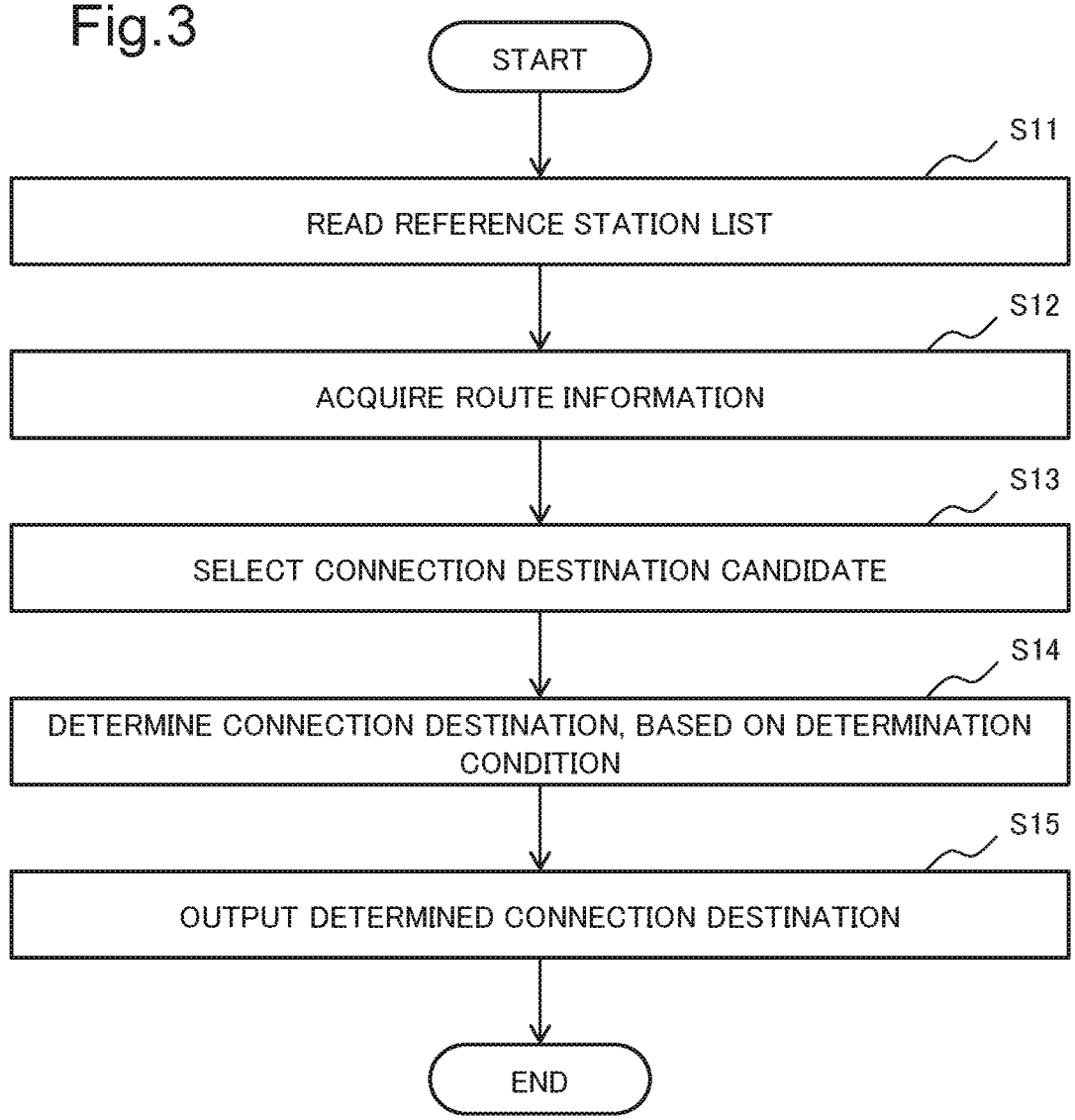
FIG. 3 is a flowchart illustrating one example of an operation of a connection destination determination device provided in the position measuring system according to the first example embodiment of the present invention.

FIG. 3 is a flowchart for describing connection destination determination processing by the connection destination determination device 10 of the position measuring system 1. Note that, in the description relating to the flowchart of FIG. 3, examples (FIGS. 4 to 6) of displaying a processing result on a monitor 110 of a car navigation system are described together.

In FIG. 3, first, the connection destination determination device 10 reads a reference station list (step S11).

Next, the connection destination determination device 10 acquires route information (step S12).

Figure 4:
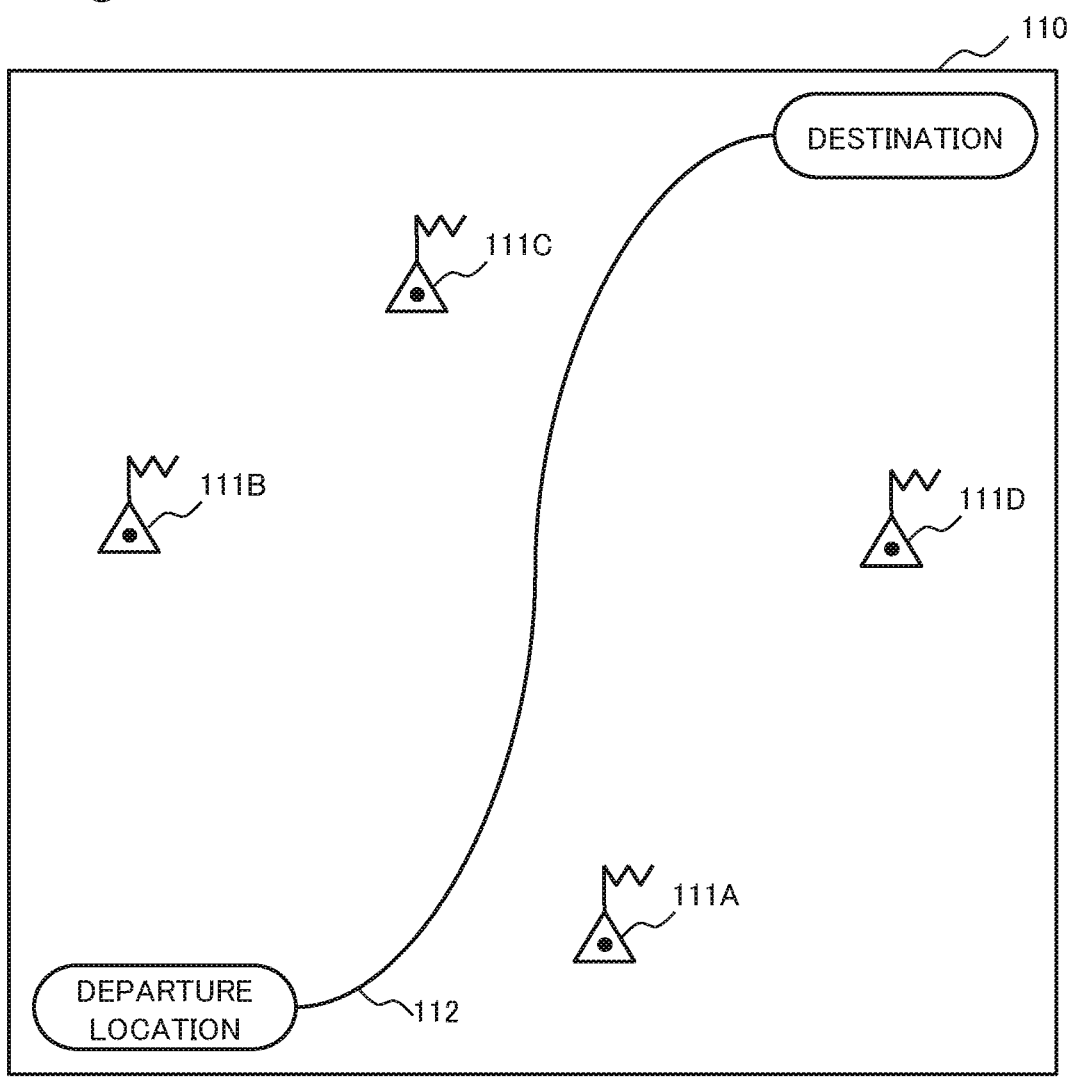
FIG. 4 is a conceptual diagram illustrating one example in which the connection destination determination device of the position measuring system according to the first example embodiment of the present invention displays a route and a reference station on a monitor.

FIG. 4 is an example of displaying, on the monitor 110, reference stations 111A to D read in the step S11, and a route 112 included in the route information acquired in the step S12.

Next, the connection destination determination device 10 selects a connection destination candidate, based on a distance between each reference station included in the reference station list and each route coordinate included in the route information (step S13).

Figure 5:
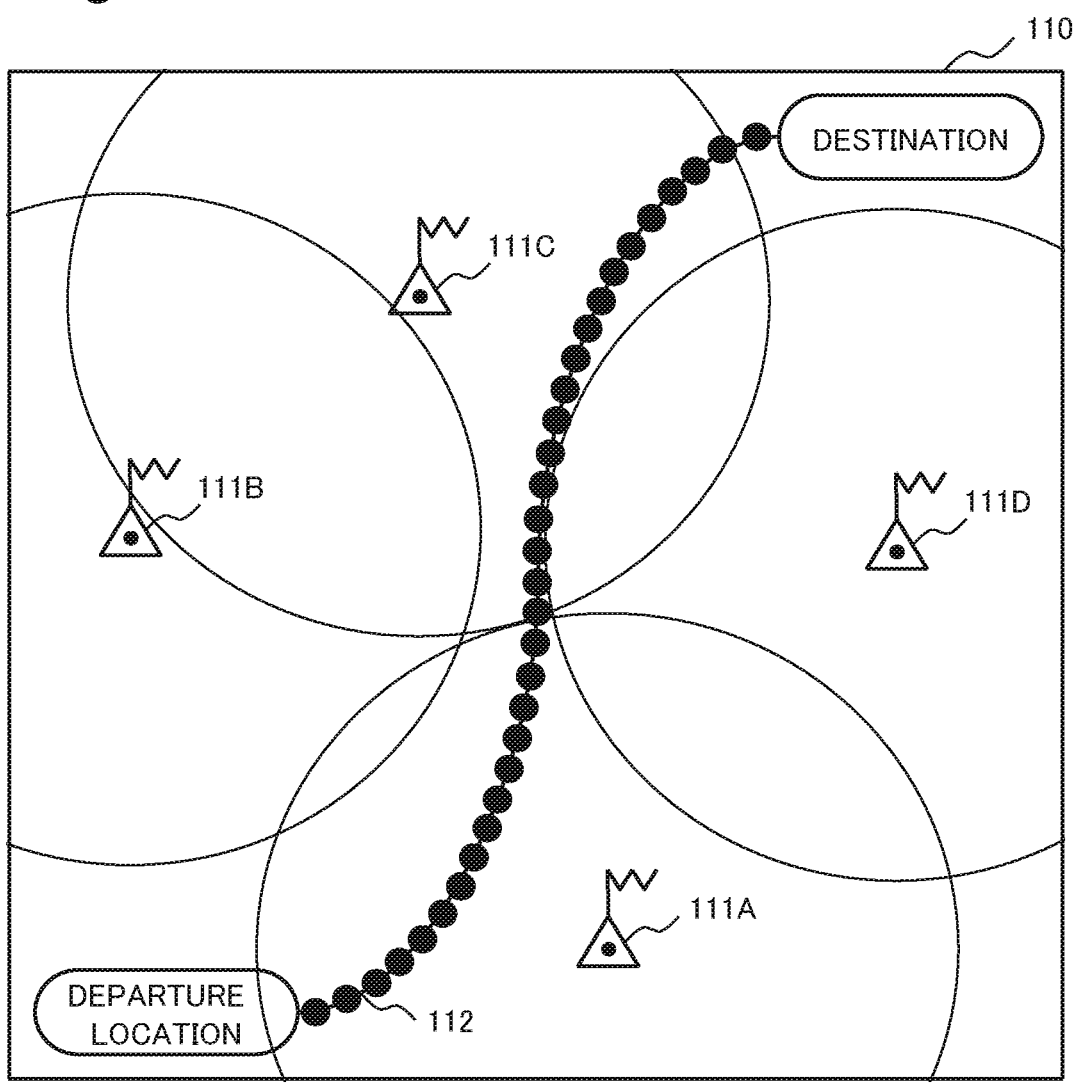
FIG. 5 is a conceptual diagram illustrating one example of selecting a connection destination candidate by the connection destination determination device of the position measuring system according to the first example embodiment of the present invention.

FIG. 5 is an example of displaying a route coordinate by a circle blackened on the route 112 when the connection destination determination device 10 selects a connection destination candidate, in the step S13. A large circle around each of the reference stations 111A to D indicates a range of a predetermined distance from each of the reference stations 111A to D.

The connection destination determination device 10 calculates a distance between each reference station included in the reference station list and each route coordinate included in the route information, and selects, as a connection destination candidate, a reference station within the predetermined range from each route coordinate. Moreover, in relation to a route coordinate having less than three connection destination candidates, the connection destination determination device 10 adds a closest one of reference stations located out of a predetermined range to a connection destination candidate.

Next, the connection destination determination device 10 determines a connection destination, based on a determination condition (step S14).

Figure 6:
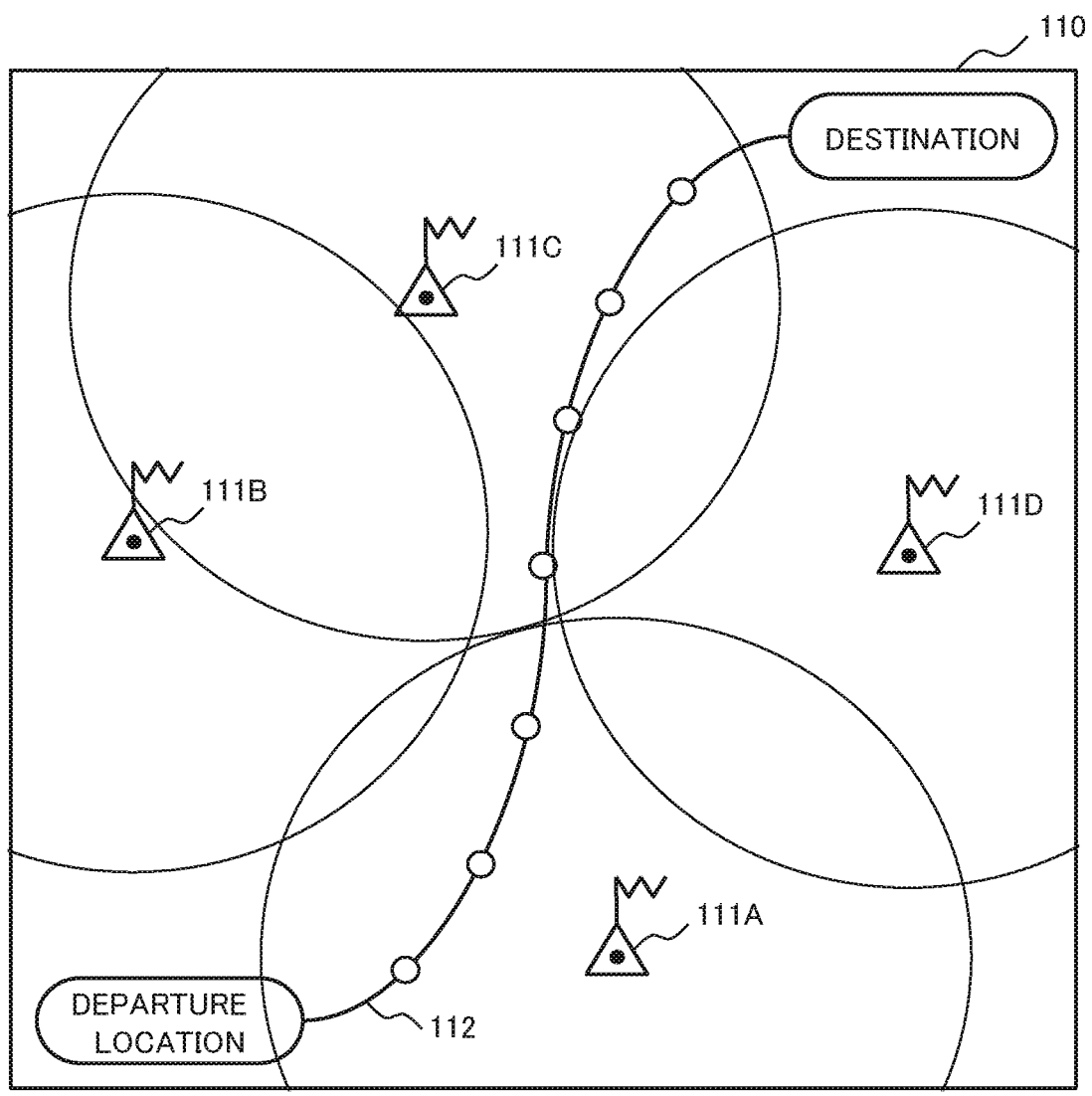
FIG. 6 is a conceptual diagram illustrating one example of determining a connection destination candidate by the connection destination determination device of the position measuring system according to the first example embodiment of the present invention.

FIG. 6 is an example of displaying, with a whitened circle on the route 112, a coordinate (also referred to as an estimated relay coordinate) of each of a plurality of relay spots set on a route from a departure location to an estimated arrival location, when a connection destination candidate is added, in the step S14.

Then, the connection destination determination device 10 outputs the determined connection destination to the position information generation device 20 (step S15).

The above is a description regarding the connection destination determination processing by the connection destination determination device 10.

Position Information Generation Processing

Figure 7:
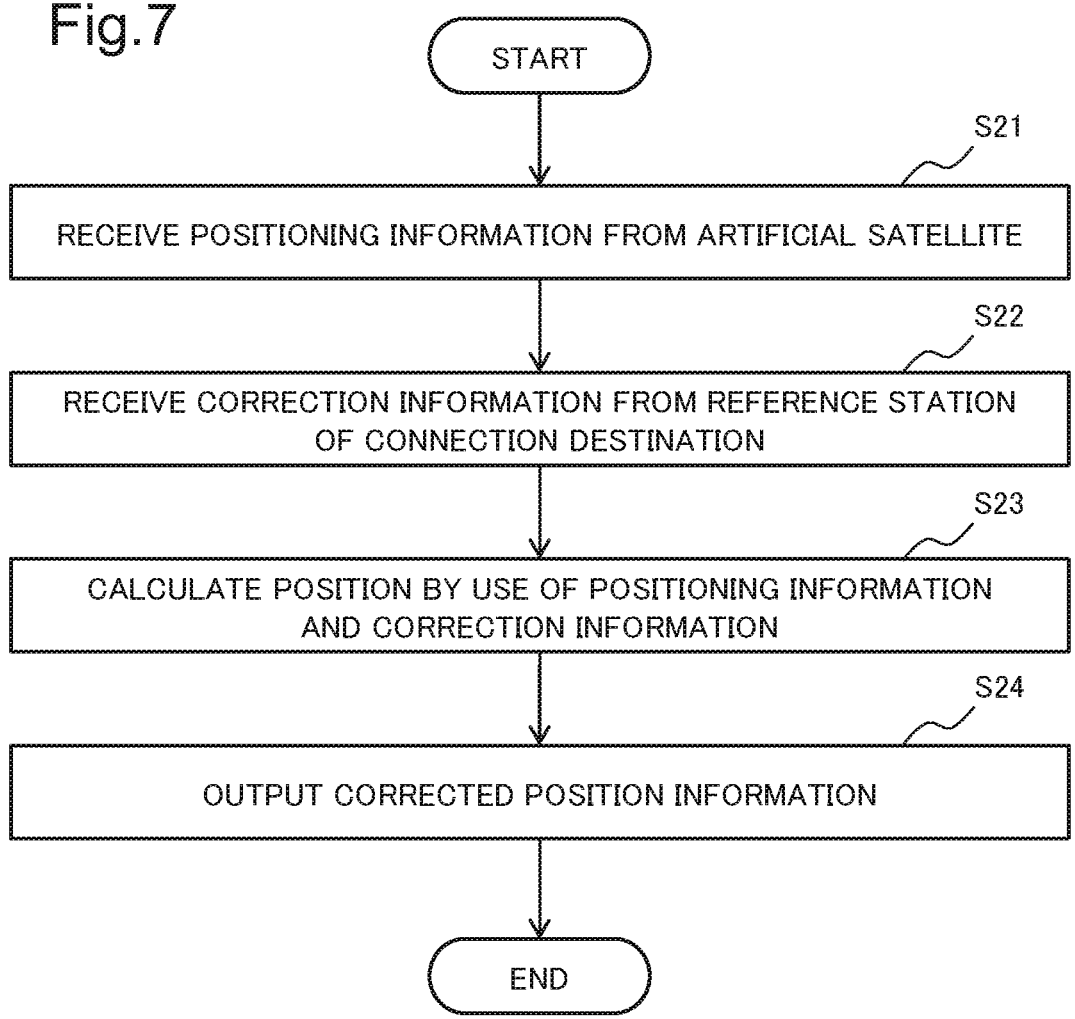
FIG. 7 is a flowchart illustrating one example of an operation of a position information generation device provided in the position measuring system according to the first example embodiment of the present invention.

FIG. 7 is a flowchart for describing position information generation processing by the position information generation device 20. The position information generation processing below is processing similar to general PPP.

In FIG. 7, first, the position information generation device 20 receives positioning information from an artificial satellite (step S21).

Next, the position information generation device 20 receives correction information from a reference station determined as a connection destination (step S22).

Next, the position information generation device 20 calculates position information by PPP by use of the received positioning information and correction information (step S23).

Then, the position information generation device 20 outputs the calculated position information (step S24).

The above is a description regarding the position information generation processing by the position information generation device 20.

As above, the position measuring system according to the present example embodiment selects a plurality of reference stations of connection destination candidates, and determines a reference station to be actually connected from among the selected connection destination candidates, based on a predetermined determination condition. As a result, the position measuring system according to the present example embodiment is able to determine an optimal reference station according to circumstances, and calculate highly accurate position information, based on correction information of the determined reference station.

Second Example Embodiment

Figure 8:
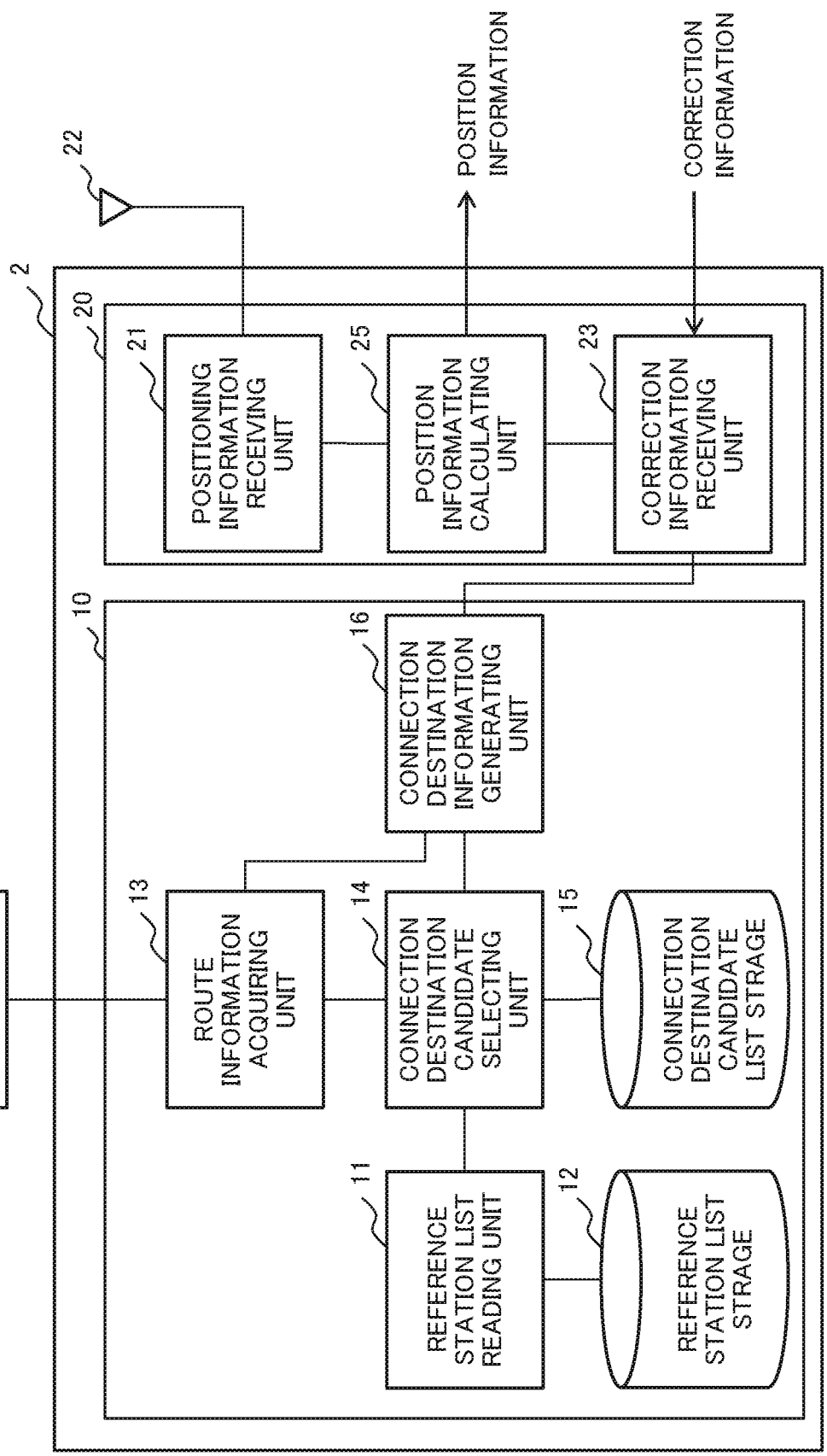
FIG. 8 is a block diagram illustrating a configuration of a position measuring system according to a second example embodiment of the present invention.

Next, a position measuring system according to a second example embodiment is described with reference to the drawings. The present example embodiment is a specific form of the first example embodiment. FIG. 8 is a block diagram illustrating a configuration of a position measuring system 2 according to the present example embodiment.

Connection Destination Determination Device

First, a detailed configuration of a connection destination determination device 10 is described. As in FIG. 8, the connection destination determination device 10 includes a reference station list reading unit 11, a reference station list storage 12, a route information acquiring unit 13, a connection destination candidate selecting unit 14, a connection destination candidate list storage 15, and a connection destination information generating unit 16.

The reference station list reading unit 11 reads a reference station list stored in the reference station list storage 12.

FIG. 9 is one example of a reference station list (a reference station list 121) stored in the reference station list storage 12. The reference station list 121 includes at least a station number and a reference station coordinate of each reference station. The reference station coordinate of the reference station list 121 includes longitude and latitude. Note that the reference station coordinate of the reference station list 121 may include altitude. Moreover, the reference station list 121 may include a time at which positioning information is acquired.

The reference station list reading unit 11 outputs the read reference station list to the connection destination candidate selecting unit 14. For example, the reference station list reading unit 11 outputs, to the connection destination candidate selecting unit 14, information relating to all reference stations included in the read reference station list.

Furthermore, the reference station list reading unit 11 may output, to the connection destination candidate selecting unit 14, a reference station within an area where the position measuring system 2 is located, from among reference stations included in the read reference station list.

FIG. 10 is an example in which information on an area where a reference station is located is included in a reference station list (a reference station list 122). For example, when the position measuring system 2 is located in an area A, the reference station list reading unit 11 outputs information relating to a reference station in the area A to the connection destination candidate selecting unit 14. Moreover, for example, when the position measuring system 2 is located in an area B, the reference station list reading unit 11 outputs information relating to a reference station in the area B to the connection destination candidate selecting unit 14. As in the example of using the reference station list 122 in FIG. 10, reference stations targeted for calculating distances are decreased by narrowing down reference stations, based on area information, and therefore, processing in which the connection destination candidate selecting unit 14 selects a connection destination candidate can be reduced.

A reference station list collecting a plurality of reference stations is stored in the reference station list storage 12.

The route information acquiring unit 13 acquires, from a navigation system 100, information on a route via which to arrive at a destination from a departure location. Normally, a current position of a moving body mounted with the position measuring system 2 is set to a departure location. The route information acquiring unit 13 outputs the acquired route information to the connection destination candidate selecting unit 14 and the connection destination information generating unit 16.

The connection destination candidate selecting unit 14 acquires a reference station list from the reference station list reading unit 11, and acquires route information from the route information acquiring unit 13. The connection destination candidate selecting unit 14 calculates a distance between each of a plurality of route coordinates included in the route information and each of a plurality of reference stations included in the reference station list. The connection destination candidate selecting unit 14 calculates a distance between each reference station coordinate and each route coordinate. The connection destination candidate selecting unit 14 counts a reference station whose distance from each route coordinate is within a predetermined range, as a connection destination candidate relating to each route coordinate.

For example, a predetermined range is set within a circle having a radius of 50 kilometers around a route coordinate. Normally, since electronic reference points are disposed at intervals of 20 kilometers on average, a plurality of electronic reference points are located within the circle having a radius of 50 kilometers.

The connection destination candidate selecting unit 14 generates a connection destination candidate list collecting the selected connection destination candidates, and stores the generated connection destination candidate list in the connection destination candidate list storage 15.

FIG. 11 is one example (a connection destination candidate list 151) of a connection destination list stored in the connection destination candidate list storage 15. As in FIG. 11, reference stations located within a predetermined range are collected in the connection destination candidate list 151 in ascending order of station numbers in relation to each route coordinate. Moreover, the connection destination candidate list 151 includes a count indicating a number of connection destination candidates. Note that the connection destination candidate list 151 includes only up to three station numbers, but may include four or more station numbers.

The connection destination candidate selecting unit 14 checks a connection destination candidate count for each route coordinate, then extracts, for a route coordinate whose connection destination candidate count is less than 3, three reference stations in ascending order of distance from the route coordinate, and adds the extracted reference stations to connection destination candidates when the reference stations are not connection destination candidates. Connection destination candidates are determined at a point where three connection destination candidates are selected with regard to all route coordinates. The connection destination candidates determined herein are preferably not updated until a predetermined time elapses, except when a route is changed. For example, a predetermined time is set to 30 minutes. Note that, instead of being managed by time, the connection destination candidates may be updated at a point where a spot (hereinafter, an estimated arrival location) that is estimated to be arrived at a predetermined time later from a current point becomes the same as or close to a current location.

FIG. 12 is a connection destination candidate list 152 in which a connection destination candidate is updated by the connection destination candidate selecting unit 14. The connection destination candidate list 152 in FIG. 12 includes three connection destination candidates in relation to each of all route coordinates, and a count is updated to 3. However, counting may be set in such a way that only reference stations within a predetermined range are counted, and reference stations outside the predetermined range are not counted. In addition, the connection destination candidate list 151 in FIG. 11 and the connection destination candidate list 152 in FIG. 12 are the same list, but difference reference signs are given for differentiation in description.

The connection destination candidate selecting unit 14 outputs the selected connection destination candidate to the connection destination information generating unit 16. The connection destination candidate selecting unit 14 may transmit connection destination candidates in a list form, or may individually transmit connection destination candidates.

A connection destination candidate list collecting connection destination candidates is stored in the connection destination candidate list storage 15.

The connection destination information generating unit 16 acquires connection destination candidates from the connection destination candidate selecting unit 14. The connection destination information generating unit 16 determines a connection destination from among the acquired connection destination candidates, and outputs connection destination information relating to the determined connection destination.

The connection destination information generating unit 16 sets a current position to a departure location, and extracts coordinates (hereinafter, estimated relay coordinates) of a plurality of relay spots from a route from the departure location to an estimated arrival location. For example, the connection destination information generating unit 16 sets a required time to 30 minutes, and selects an estimated relay coordinate for every 3 minutes, in such a way as 3 minutes later, 6 minutes later, 9 minutes later, . . . from a current point.

Then, the connection destination information generating unit 16 calculates a sum value (also referred to as a determined value) of condition values in relation to each connection destination candidate, based on a determination condition. The connection destination information generating unit 16 outputs connection destination information including a connection destination whose determination value is minimal except for 0.

The connection destination information generating unit 16 calculates a distance between a connection destination and a current position after a predetermined time has elapsed, and keeps using the determined connection destination when the calculated distance is smaller than a predetermined distance. The connection destination information generating unit 16 re-determines a connection destination at timing when a calculated distance exceeds the predetermined distance. When changing a connection destination, the connection destination information generating unit 16 outputs determined connection destination information. Note that the connection destination information generating unit 16 may output connection destination information even when not changing a connection destination.

Position Information Generation Device

Next, a detailed configuration of a position information generation device 20 is described. As in FIG. 8, the position information generation device 20 includes a positioning information receiving unit 21, an antenna 22, a correction information receiving unit 23, and a position information calculating unit 25.

The positioning information receiving unit 21 receives a radio wave transmitted from an artificial satellite, via the antenna 22. The positioning information receiving unit 21 demodulates a signal including positioning information of the artificial satellite from the received radio wave. The positioning information receiving unit 21 outputs the positioning information of the artificial satellite to the position information calculating unit 25.

The correction information receiving unit 23 receives a signal transmitted from a reference station set to a connection destination at a current point, via a network such as the Internet. The correction information receiving unit 23 demodulates a signal including correction information from the received signal. The correction information receiving unit 23 outputs correction information of the reference station to the position information calculating unit 25.

The position information calculating unit 25 acquires the positioning information from the positioning information receiving unit 21, and acquires the correction information from the correction information receiving unit 23. The position information calculating unit 25 calculates position information by PPP, by use of the acquired positioning information and correction information. The position information calculating unit 25 outputs the calculated position information. An output destination of position information can be set to any destination such as the navigation system 100 or a non-illustrated monitor.

Connection Destination Candidate Selecting Unit

Figure 13:
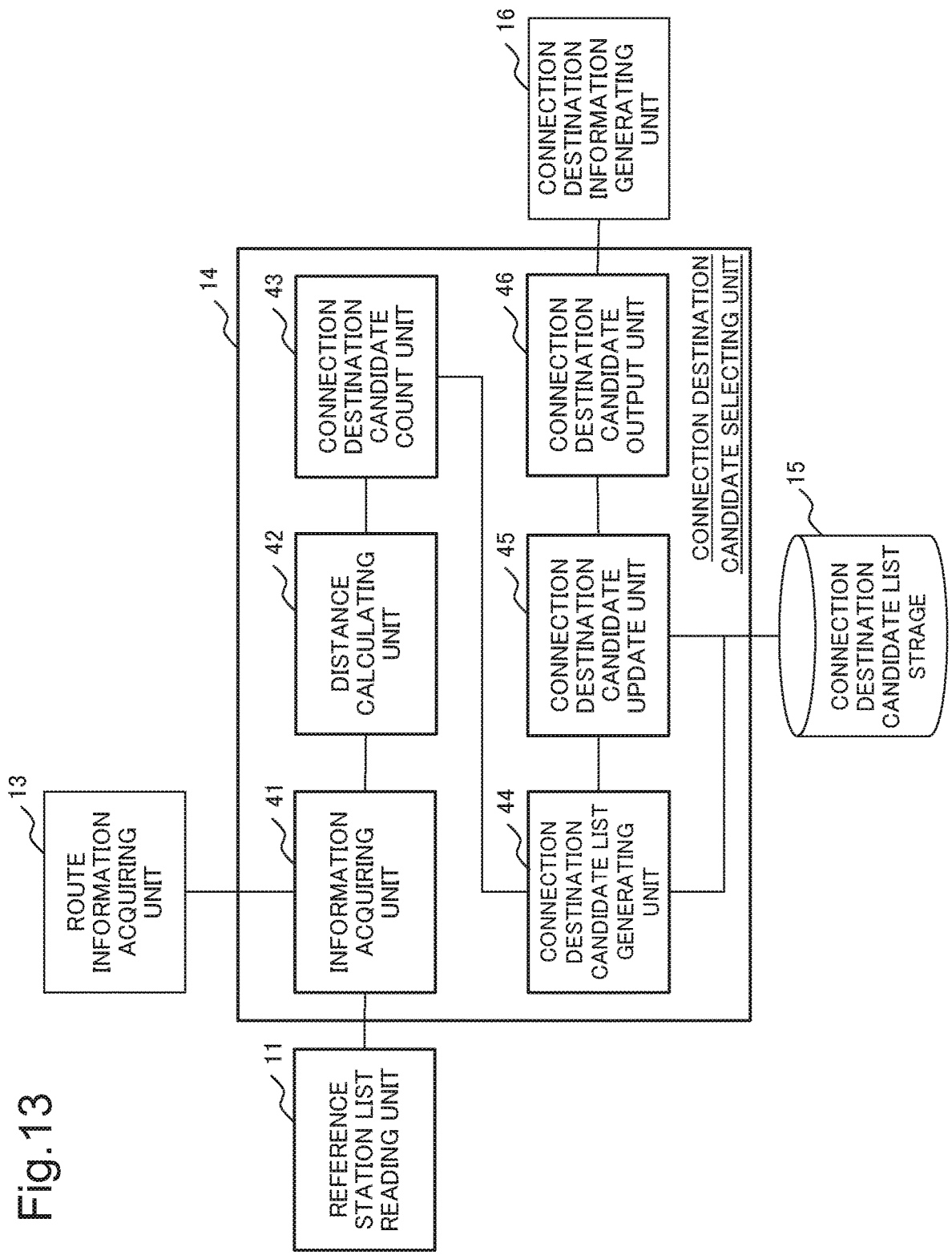
FIG. 13 is a block diagram illustrating a configuration of a connection destination candidate selecting unit of the connection destination determination device provided in the position measuring system according to the second example embodiment of the present invention.

Next, the connection destination candidate selecting unit 14 is described with reference to the drawings. FIG. 13 is a block diagram illustrating a detailed configuration of the connection destination candidate selecting unit 14. As in FIG. 13, the connection destination candidate selecting unit 14 includes an information acquiring unit 41, a distance calculating unit 42, a connection destination candidate count unit 43, a connection destination candidate list generating unit 44, a connection destination candidate update unit 45, and a connection destination candidate output unit 46.

The information acquiring unit 41 is connected to the reference station list reading unit 11 and the route information acquiring unit 13. Moreover, the information acquiring unit 41 is connected to the distance calculating unit 42.

The information acquiring unit 41 acquires a reference station list from the reference station list reading unit 11, and acquires route information from the route information acquiring unit 13. The information acquiring unit 41 outputs the acquired reference station list and route information to the distance calculating unit 42.

The distance calculating unit 42 is connected to the information acquiring unit 41 and the connection destination candidate count unit 43.

The distance calculating unit 42 acquires the reference station list and route information from the information acquiring unit 41. The distance calculating unit 42 calculates a distance between a plurality of route coordinates included in the route information and reference stations included in the reference station list. For example, the distance calculating unit 42 calculates a distance between each reference station coordinate and a route coordinate in a listing order in the reference station list. The distance calculating unit 42 outputs a calculation result to the connection destination candidate count unit 43.

The connection destination candidate count unit 43 is connected to the distance calculating unit 42 and the connection destination candidate list generating unit 44.

The connection destination candidate count unit 43 acquires the calculation result from the distance calculating unit 42, and counts a reference station whose distance from each route coordinate is within a predetermined range, as a connection destination candidate relating to each route coordinate. The connection destination candidate count unit 43 outputs information relating to the counted connection destination candidate to the connection destination candidate list generating unit 44.

The connection destination candidate list generating unit 44 is connected to the connection destination candidate list storage 15. Moreover, the connection destination candidate list generating unit 44 is connected to the connection destination candidate count unit 43 and the connection destination candidate update unit 45.

The connection destination candidate list generating unit 44 generates a connection destination candidate list collecting the connection destination candidates counted by the connection destination candidate count unit 43. The connection destination candidate list generating unit 44 stores the generated connection destination candidate list in the connection destination candidate list storage 15. When storing the connection destination candidate list in the connection destination candidate list storage 15, the connection destination candidate list generating unit 44 outputs an update instruction for a connection destination candidate list to the connection destination candidate update unit 45.

For example, the connection destination candidate list generating unit 44 counts a reference station within a circle having a radius of 50 kilometers from each route coordinate, as a connection destination candidate relating to each route coordinate. Then, the connection destination candidate list generating unit 44 adds, to the connection destination candidate list, a reference station whose distance from a route coordinate is within 50 kilometers. Since electronic reference points are disposed at intervals of 20 kilometers on average, a plurality of electronic reference points are included within a predetermined range when the predetermined range is set to 50 kilometers. Thus, a plurality of connection destination candidates for each route are selected.

The connection destination candidate update unit 45 is connected to the connection destination candidate list storage 15. Moreover, the connection destination candidate update unit 45 is connected to the connection destination candidate list generating unit 44 and the connection destination candidate output unit 46.

When acquiring the update instruction for the connection destination candidate list from the connection destination candidate list generating unit 44, the connection destination candidate update unit 45 acquires a connection destination candidate list from the connection destination candidate list storage 15 in response to the update instruction. The connection destination candidate update unit 45 checks a connection destination candidate count for each route coordinate, and then extracts, in relation to a route coordinate whose connection destination candidate count is less than a predetermined number (e.g., 3), reference stations in ascending order of distance from the route coordinate. When the extracted reference station is not included in the connection destination candidate list, the connection destination candidate update unit 45 adds the reference station to the connection destination candidate list, and updates the connection destination candidate list stored in the connection destination candidate list storage 15. At a point where a predetermined number (e.g., 3) of connection destination candidates are selected with regard to all route coordinates, the connection destination candidate update unit 45 outputs the updated connection destination candidate list to the connection destination candidate output unit 46.

For example, in relation to a route coordinate whose count is less than 3, the connection destination candidate update unit 45 adds, to the connection destination candidate, a reference station located outside a circle having a radius of 50 kilometers from each route coordinate.

The connection destination candidate output unit 46 is connected to the connection destination information generating unit 16. Moreover, the connection destination candidate output unit 46 is connected to the connection destination candidate update unit 45. The connection destination candidate output unit 46 outputs, to the connection destination information generating unit 16, the connection destination candidate list acquired from the connection destination candidate update unit 45.

Connection Destination Information Generating Unit

Figure 14:
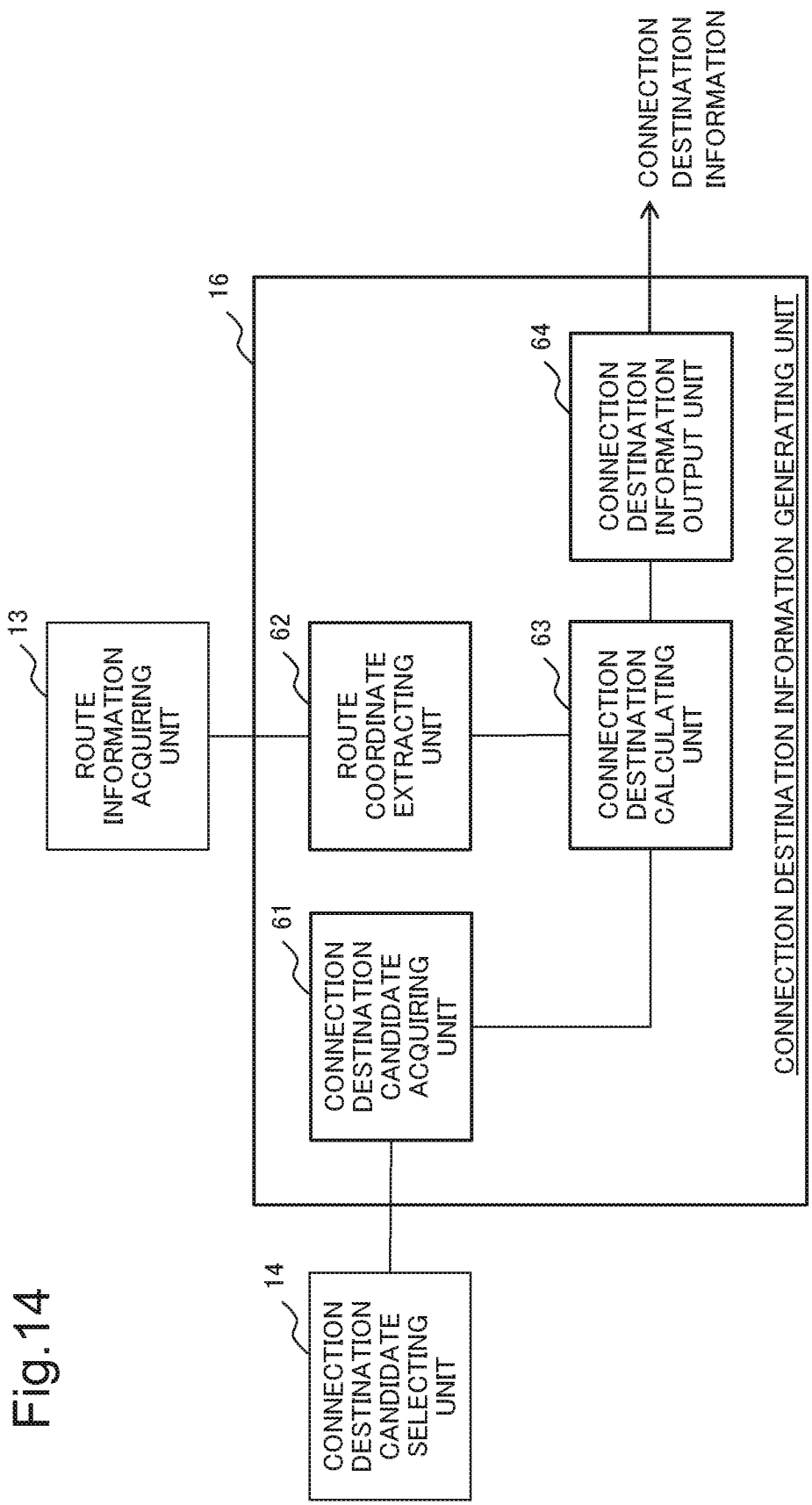
FIG. 14 is a block diagram illustrating a configuration of a connection destination information generating unit of the connection destination determination device provided in the position measuring system according to the second example embodiment of the present invention.

Next, the connection destination information generating unit 16 is described with reference to the drawings. FIG. 14 is a block diagram illustrating a detailed configuration of the connection destination information generating unit 16. As in FIG. 14, the connection destination information generating unit 16 includes a connection destination candidate acquiring unit 61, a route coordinate extracting unit 62, a connection destination calculating unit 63, and a connection destination information output unit 64.

The connection destination candidate acquiring unit 61 is connected to the connection destination candidate selecting unit 14. Moreover, the connection destination candidate acquiring unit 61 is connected to the connection destination calculating unit 63. The connection destination candidate acquiring unit 61 acquires a connection destination candidate output from the connection destination candidate selecting unit 14. The connection destination candidate acquiring unit 61 outputs the acquired connection destination candidate to the connection destination calculating unit 63.

The route coordinate extracting unit 62 is connected to the route information acquiring unit 13. Moreover, the route coordinate extracting unit 62 is connected to the connection destination calculating unit 63. The route coordinate extracting unit 62 sets a current position to a departure location, and extracts a plurality of route coordinates (estimated relay coordinates) from a route to an estimated arrival location estimated to be arrived at a predetermined time later from a current point. The route coordinate extracting unit 62 outputs the extracted estimated relay coordinates to the connection destination calculating unit 63.

The connection destination calculating unit 63 is connected to the connection destination candidate acquiring unit 61, the route coordinate extracting unit 62, and the connection destination information output unit 64. The connection destination calculating unit 63 acquires a connection destination candidate from the connection destination candidate acquiring unit 61, and acquires an estimated relay coordinate from the route coordinate extracting unit 62. The connection destination calculating unit 63 calculates a distance between the acquired connection destination candidate and the estimated relay coordinate.

For example, from a route to an estimated arrival location estimated to be arrived at 30 minutes later, the connection destination calculating unit 63 extracts estimated relay coordinates of ten points including the estimated arrival location. For example, when estimated relay coordinates of ten points are extracted at equal intervals (every 3 minutes) from the route to a location estimated to be arrived at 30 minutes later, an estimated relay coordinate of one point is extracted every 3 minutes.

The connection destination calculating unit 63 calculates a determination value, based on a determination condition in relation to each connection destination candidate, determines, as a connection destination, a connection destination candidate whose determination value is minimal except for 0, and outputs connection destination information relating to the determined connection destination to the connection destination information output unit 64.

The connection destination information output unit 64 is connected to the connection destination calculating unit 63. The connection destination information output unit 64 outputs the connection destination information output by the connection destination calculating unit 63.

Connection Destination Calculating Unit

Figure 15:
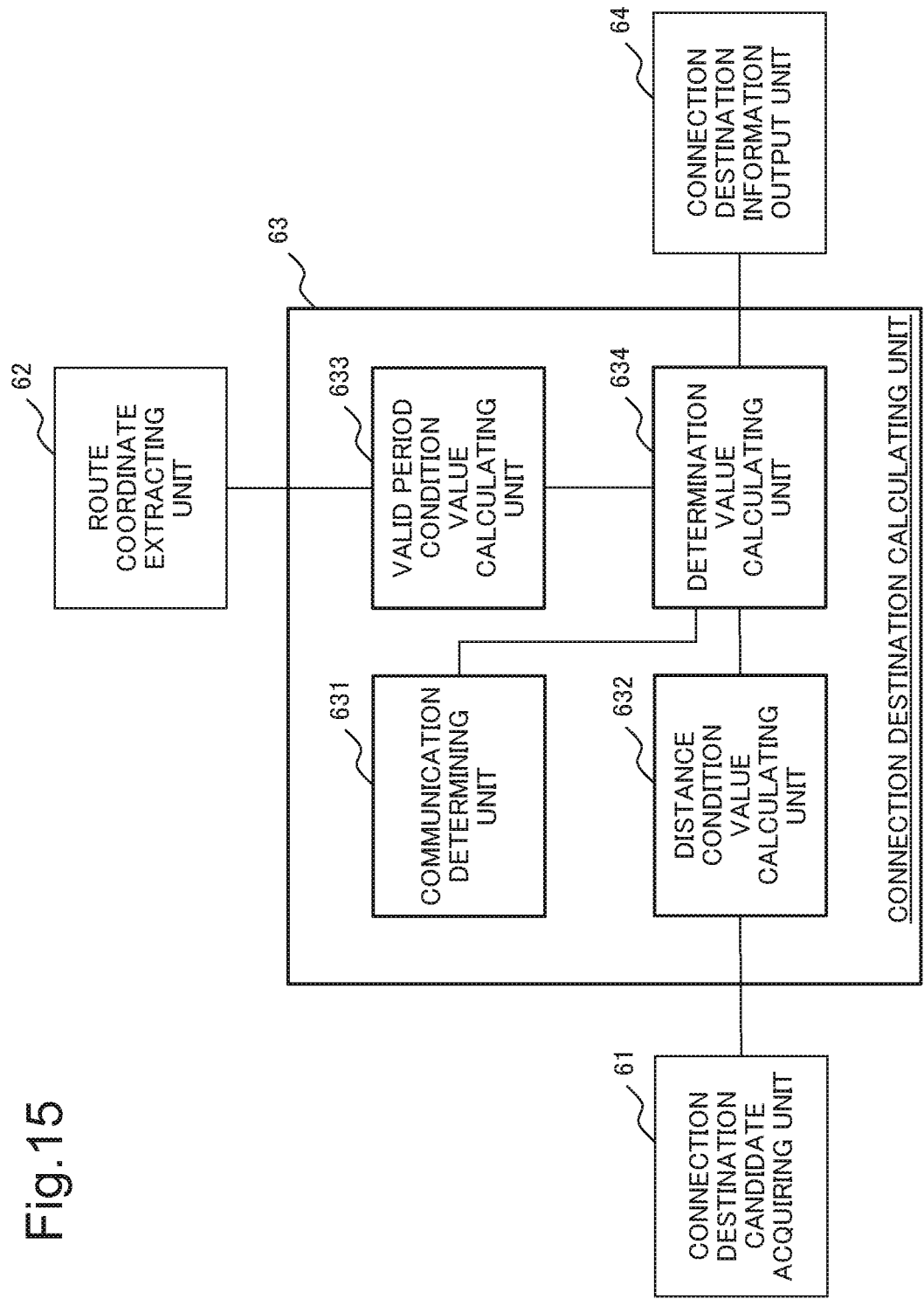
FIG. 15 is a block diagram illustrating a configuration of a connection destination calculating unit included in the connection destination information generating unit of the connection destination determination device provided in the position measuring system according to the second example embodiment of the present invention.

Herein, the connection destination calculating unit 63 included in the connection destination information generating unit 16 is described with reference to the drawings. FIG. 15 is a block diagram illustrating a detailed configuration of the connection destination calculating unit 63. As in FIG. 15, the connection destination calculating unit 63 includes a communication determining unit 631, a distance condition value calculating unit 632, a valid period condition value calculating unit 633, and a determination value calculating unit 634.

The communication determining unit 631 determines whether or not network connection to a connection destination candidate is possible, and outputs a communication condition value representing a determination result to the determination value calculating unit 634. The communication determining unit 631 outputs 0 when connection is not possible, and outputs 1 when connection is possible.

The distance condition value calculating unit 632 calculates a distance condition being a representing value of a distance between an estimated relay coordinate and a reference station. For example, the distance condition value calculating unit 632 sets to a distance condition value, an average distance of distances between ten points extracted by the connection destination information generating unit 16 and a reference station. For example, an average value such as an arithmetic average value, a harmonic average value, or geometric average value, or a medium value can be cited as a representing value set to a distance condition value. The distance condition value calculating unit 632 outputs the calculated distance condition value to the determination value calculating unit 634.

The valid period condition value calculating unit 633 calculates a number of route coordinates whose distances from a current connection destination are located within a predetermined range, among route coordinates on a route farther than an estimated arrival location. For example, the valid period condition value calculating unit 633 sets, to a valid period condition value, a number of route coordinates whose distances from a currently selected reference station are within 50 kilometers, on a route at and farther than an estimated arrival location estimated to be arrived at 30 minutes later. The valid period condition value calculating unit 633 outputs the set valid period condition value to the determination value calculating unit 634.

The determination value calculating unit 634 calculates a determination value for each connection destination candidate by applying the condition values each acquired from the communication determining unit 631, the distance condition value calculating unit 632, and the valid period condition value calculating unit 633 to Equation 1 below. In Equation 1, TJ indicates a determination value, T1j indicates a communication condition value, T2j indicates a distance condition value, and T3j indicates a valid period condition value. Note that Equation 1 below is one example, and does not limit an equation for calculating a determination value.

$$TJ = T1j \times T2j \times (10/T3j) \quad (1)$$

FIG. 16 is a determination condition list 342 collecting a determination condition value and a determination value of each reference station. A reference station of a station number 1 has a communication condition value of 1, a distance condition value of 2.5, and a valid period condition value of 20, and has a determination value of 1.25. A reference station of a station number 2 has a communication condition value of 1, a distance condition value of 5.0, and a valid period condition value of 10, and has a determination value of 5.0. A reference station of a station number 3 has a communication condition value of 0, and therefore has a determination value of 0. When the determination values in the determination condition list in FIG. 16 are compared, the determination value of the station number 1 is minimal except for 0, and therefore, the reference station of the station number 1 is determined as a connection destination. Note that the determination condition list 342 is an example in which a determination value of each reference station is made easier to compare, and does not have to be included in the configuration according to the present example embodiment.

The connection destination calculating unit 63 generates connection destination information in which a connection destination whose determination value in Equation 1 above is minimal except for 0 is designated as a current connection destination. It is preferable not to change connection destination information generated by the connection destination calculating unit 63 in order to decrease frequency of switching a connection destination until a predetermined time elapses.

The above is a description regarding the configuration of the position measuring system 2 according to the present example embodiment.

As above, according to the present example embodiment, a specific configuration for implementing the processing illustrated in the first example embodiment becomes clear. However, the configuration included in the position measuring system according to the present example embodiment is one example, and does not limit the scope of the present invention.

Modification Examples

Next, modification examples of the position measuring system 2 according to the present example embodiment are described with reference to the drawings. Note that route information in the following modification examples is similar to route information acquired from the navigation system 100 in FIG. 8.

Figure 17:
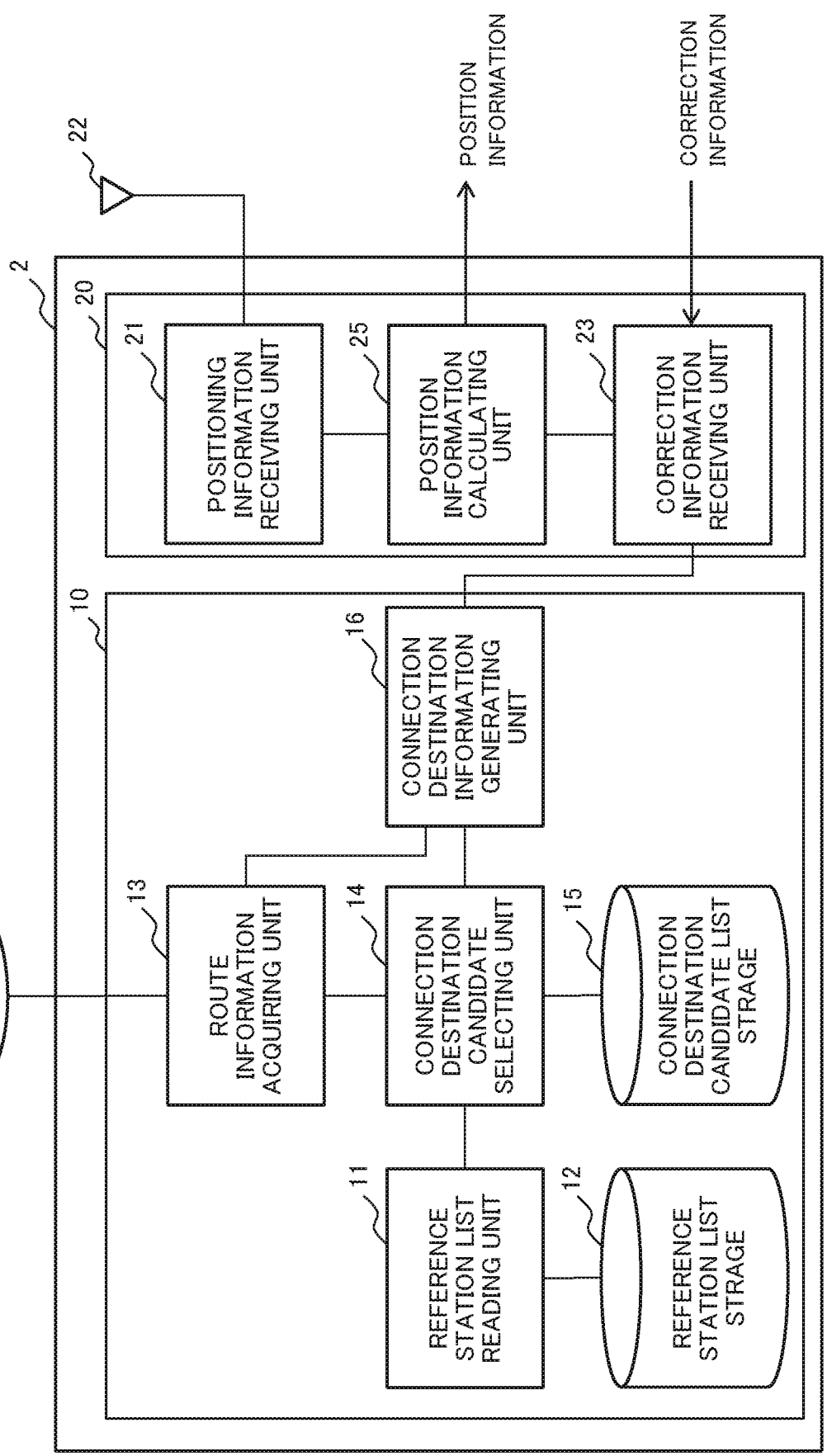
FIG. 17 is a block diagram illustrating a configuration of Modification Example 1 of the connection destination determination device provided in the position measuring system according to the second example embodiment of the present invention.

FIG. 17 is a block diagram relating to Modification Example 1. In the present modification example, a route information acquiring unit 13 is connected to a network 400 such as the Internet. For example, the route information acquiring unit 13 has a function of a network interface, and acquires route information from outside via the network 400. According to the present example embodiment, position information can be calculated in relation to a moving body which is not mounted with a navigation system as well, as long as the moving body can be connected to the network 400.

Figure 18:
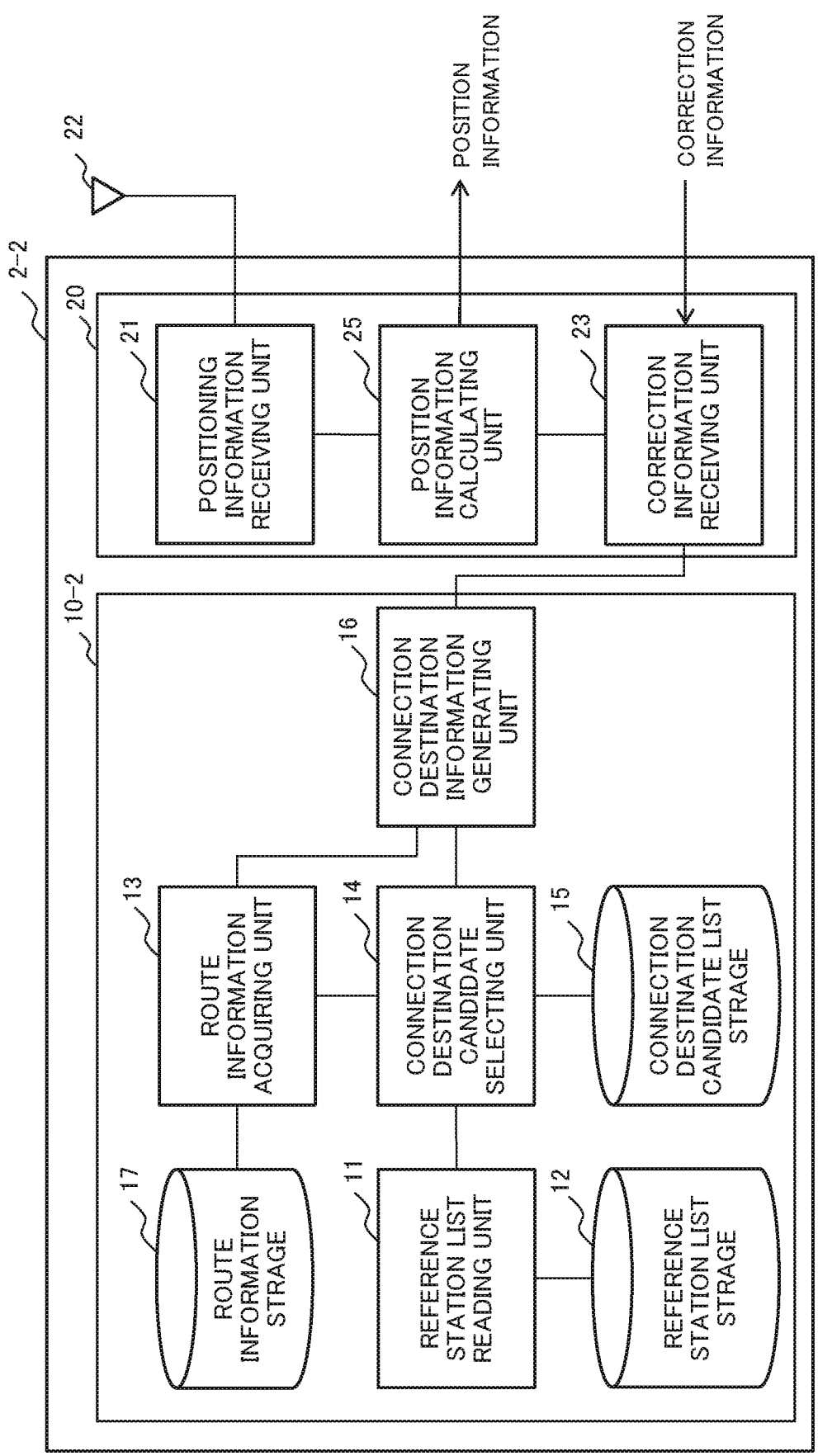
FIG. 18 is a block diagram illustrating a configuration of Modification Example 2 of the connection destination determination device provided in the position measuring system according to the second example embodiment of the present invention.

FIG. 18 is a block diagram illustrating a configuration of a position measuring system 2-2 according to Modification Example 2. As in FIG. 18, the position measuring system 2-2 includes a route information storage 17 storing route information. The present modification example is able to complete processing in the system without acquiring route information from a navigation system.

Third Example Embodiment

Next, a position measuring system according to a third example embodiment of the present invention is described with reference to the drawings. The present example embodiment is characterized by also using a fourth condition (a communication quality condition) for a determination condition of a connection destination.

Figure 19:
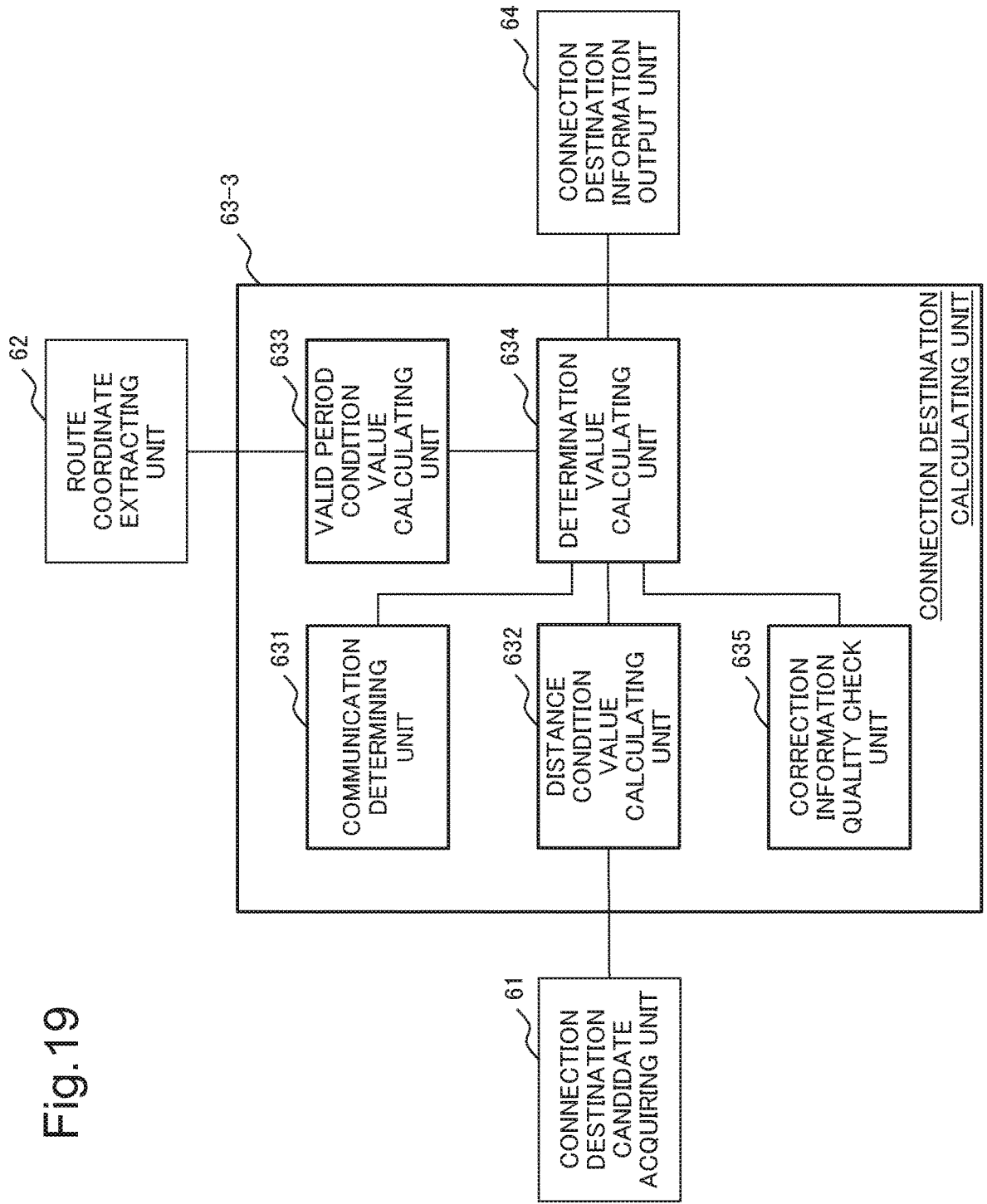
FIG. 19 is a block diagram illustrating a configuration of a connection destination calculating unit included in a connection destination information generating unit of a connection destination determination device provided in a position measuring system according to a third example embodiment of the present invention.

FIG. 19 is a block diagram illustrating a configuration of a connection destination calculating unit 63-3 included in the position measuring system according to the present example embodiment. As in FIG. 19, the connection destination calculating unit 63-3 includes a correction information quality check unit 635, in addition to a communication determining unit 631, a distance condition value calculating unit 632, a valid period condition value calculating unit 633, and a determination value calculating unit 634. The communication determining unit 631, the distance condition value calculating unit 632, the valid period condition value calculating unit 633, and the determination value calculating unit 634 are similar in configuration to the connection destination calculating unit 63 according to the second example embodiment, and therefore, a detailed description is omitted.

The correction information quality check unit 635 sets a correction information quality condition value, based on quality of received correction information. For example, the correction information quality check unit 635 sets the correction information quality condition value to 1 when quality of correction information is FIX, and sets the correction information quality condition value to 2 when quality of correction information is FLOAT. The correction information quality check unit 635 outputs the set correction information quality condition value to the determination value calculating unit 634.

For example, the determination value calculating unit 634 calculates a determination value for each connection destination candidate by applying the condition values each acquired from the communication determining unit 631, the distance condition value calculating unit 632, the valid period condition value calculating unit 633, and the correction information quality check unit 635 to Equation 2 below. In Equation 2, TJ indicates a determination value, T1j indicates a communication condition value, T2j indicates a distance condition value, T3j indicates a valid period condition value, and T4j indicates a correction information quality condition value. Note that Equation 2 below is one example, and does not limit an equation for calculating a determination value.

$$TJ = T1j \times T2j \times (10/T3j) \times T4j \quad (2)$$

FIG. 20 is a determination condition list 343 collecting a determination condition value and a determination value of each reference station. A reference station of a station number 1 has a communication condition value of 1, a distance condition value of 2.5, a valid period condition value of 20, and a correction information quality condition value of 2, and has a determination value of 2.5. A reference station of a station number 2 has a communication condition value of 1, a distance condition value of 5.0, a valid period condition value of 10, and a correction information quality condition value of 1, and has a determination value of 5.0. A reference station of a station number 3 has a communication condition value of 0, and therefore has a determination value of 0. When the determination values in the determination condition list in FIG. 20 are compared, the determination value of the station number 1 is minimal except for 0, and therefore, the reference station of the station number 1 is determined as a connection destination.

The connection destination calculating unit 63-3 generates connection destination information in which a connection destination whose determination value in Equation 2 above is minimal except for 0 is designated as a current connection destination.

As above, according to the present example embodiment, a correction information quality condition is included in a determination condition. As a result, the present example embodiment is able to determine a reference station to be a connection destination in consideration of quality of correction information, and therefore, is able to calculate position information with higher accuracy.

Fourth Example Embodiment

Next, a position measuring system according to a fourth example embodiment of the present invention is described with reference to the drawings. The present example embodiment is characterized by also using a fifth condition (a device condition) for a determination condition of a connection destination.

Figure 21:
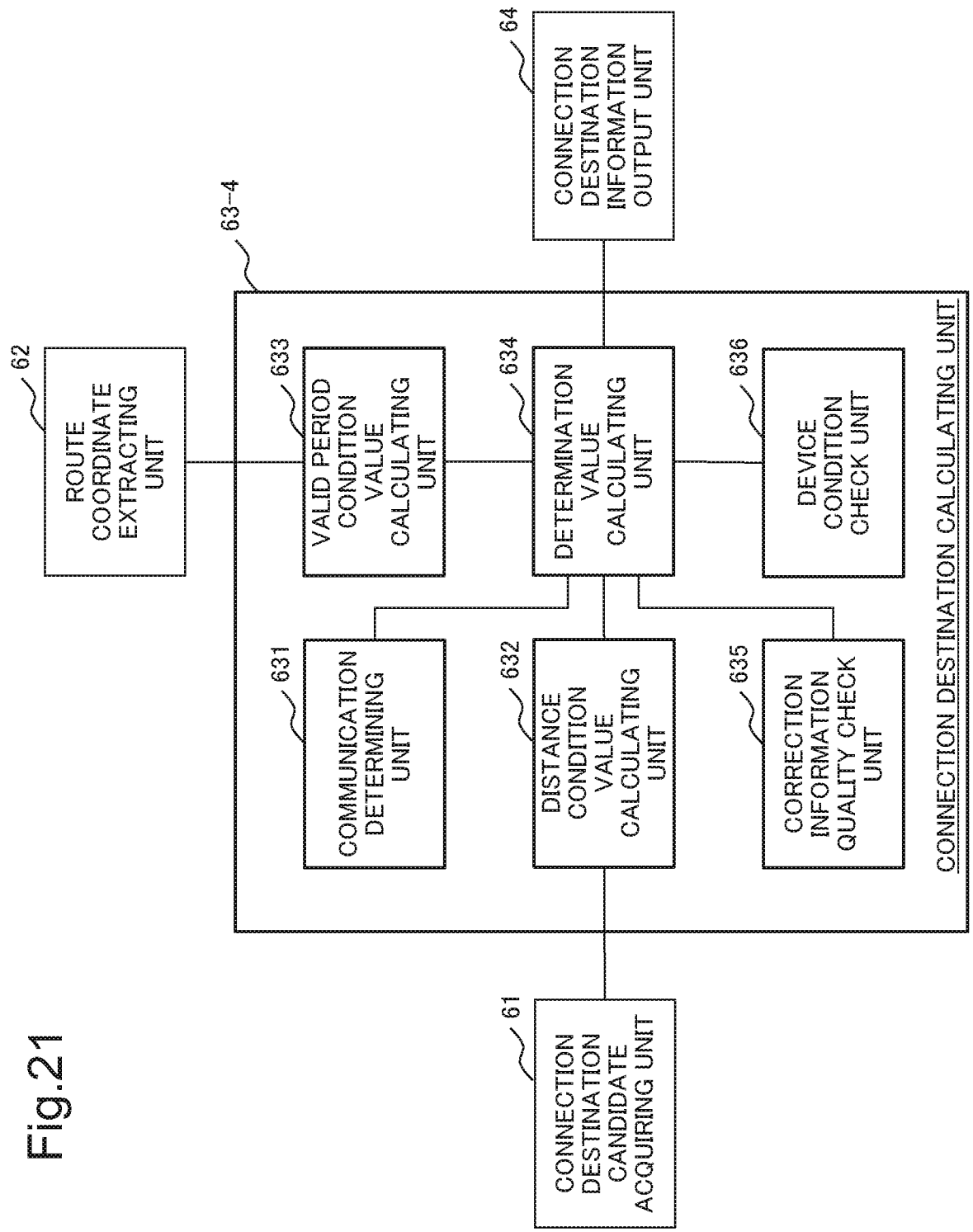
FIG. 21 is a block diagram illustrating a configuration of a connection destination calculating unit included in a connection destination information generating unit of a connection destination determination device provided in a position measuring system according to a fourth example embodiment of the present invention.

FIG. 21 is a block diagram illustrating a configuration of a connection destination calculating unit 63-4 included in the position measuring system according to the present example embodiment. As in FIG. 21, the connection destination calculating unit 63-4 includes a device condition check unit 636, in addition to a communication determining unit 631, a distance condition value calculating unit 632, a valid period condition value calculating unit 633, a determination value calculating unit 634, and a correction information quality check unit 635. The communication determining unit 631, the distance condition value calculating unit 632, the valid period condition value calculating unit 633, the determination value calculating unit 634, and the correction information quality check unit 635 are similar in configuration to the connection destination calculating unit 63-3 according to the third example embodiment, and therefore, a detailed description is omitted.

The device condition check unit 636 checks a device condition relating to a device such as a receiver or an antenna which receives a signal from an artificial satellite, and checks a device condition value. FIG. 22 is one example of a reference station list 124 including a device maker as a device condition. For example, the device condition check unit 636 may be configured in such a way as to acquire the reference station list 124 from a reference station list storage 12 storing the reference station list 124 including a device maker, and check the device maker.

In general, when a device condition such as a maker, a product name, a model, or a type of a receiver or an antenna differs, there is a possibility that a system error differing from model to model occurs in a circuit of the receiver, or a phase is shifted. Thus, the device condition check unit 636 sets a device condition value depending on a degree of coincidence between the positioning information receiving unit 21 and a receiver of a reference station. For example, the device condition check unit 636 sets a device condition value to 1 when a maker, a product name, a model, a type, or the like of a receiver or an antenna is the same, and sets a device condition value to 2 when a maker, a product name, a model, a type, or the like of a receiver or an antenna is different.

For example, the determination value calculating unit 634 calculates a determination value for each connection destination candidate by applying the condition values each acquired from the communication determining unit 631, the distance condition value calculating unit 632, the valid period condition value calculating unit 633, the correction information quality check unit 635, and the device condition check unit 636 to Equation 3 below. In Equation 3, TJ indicates a determination value, T1J indicates a communication condition value, T2J indicates a distance condition value, T3J indicates a valid period condition value, T4J indicates a correction information quality condition value, and T5J indicates a device condition value. Note that Equation 3 below is one example, and does not limit an equation for calculating a determination value.

$$TJ = T1j \times T2j \times (10/T3j) \times T4j \times T5j \qquad (3)$$

FIG. 23 is a determination condition list 344 collecting a determination condition value and a determination value of each reference station.

A reference station of a station number 1 has a communication condition value of 1, a distance condition value of 2.5, a valid period condition value of 20, a correction information quality condition value of 2, and a device condition value of 1, and therefore has a determination value of 2.5. A reference station of a station number 2 has a communication condition value of 1, a distance condition value of 5.0, a valid period condition value of 10, a correction information quality condition value of 1, and a device condition value of 2, and therefore has a determination value of 10. A reference station of a station number 3 has a communication condition value of 0, and therefore has a determination value of 0. When the determination values in the determination condition list in FIG. 23 are compared, the determination value of the station number 1 is minimal except for 0, and therefore, the reference station of the station number 1 is determined as a connection destination. Note that a determination condition list 344 is an example in which a determination value of each reference station is made easier to compare, and does not have to be included in the configuration according to the present example embodiment.

The connection destination calculating unit 63-4 generates connection destination information in which a connection destination whose determination value in Equation 3 above is minimal except for 0 is designated as a current connection destination.

As above, according to the present example embodiment, a device condition is included in a determination condition. As a result, the present example embodiment is able to determine a reference station to be a connection destination in consideration of compatibility of devices which mutually transmit and receive, and therefore, is able to calculate position information with higher accuracy.

Application Example

Figure 24:
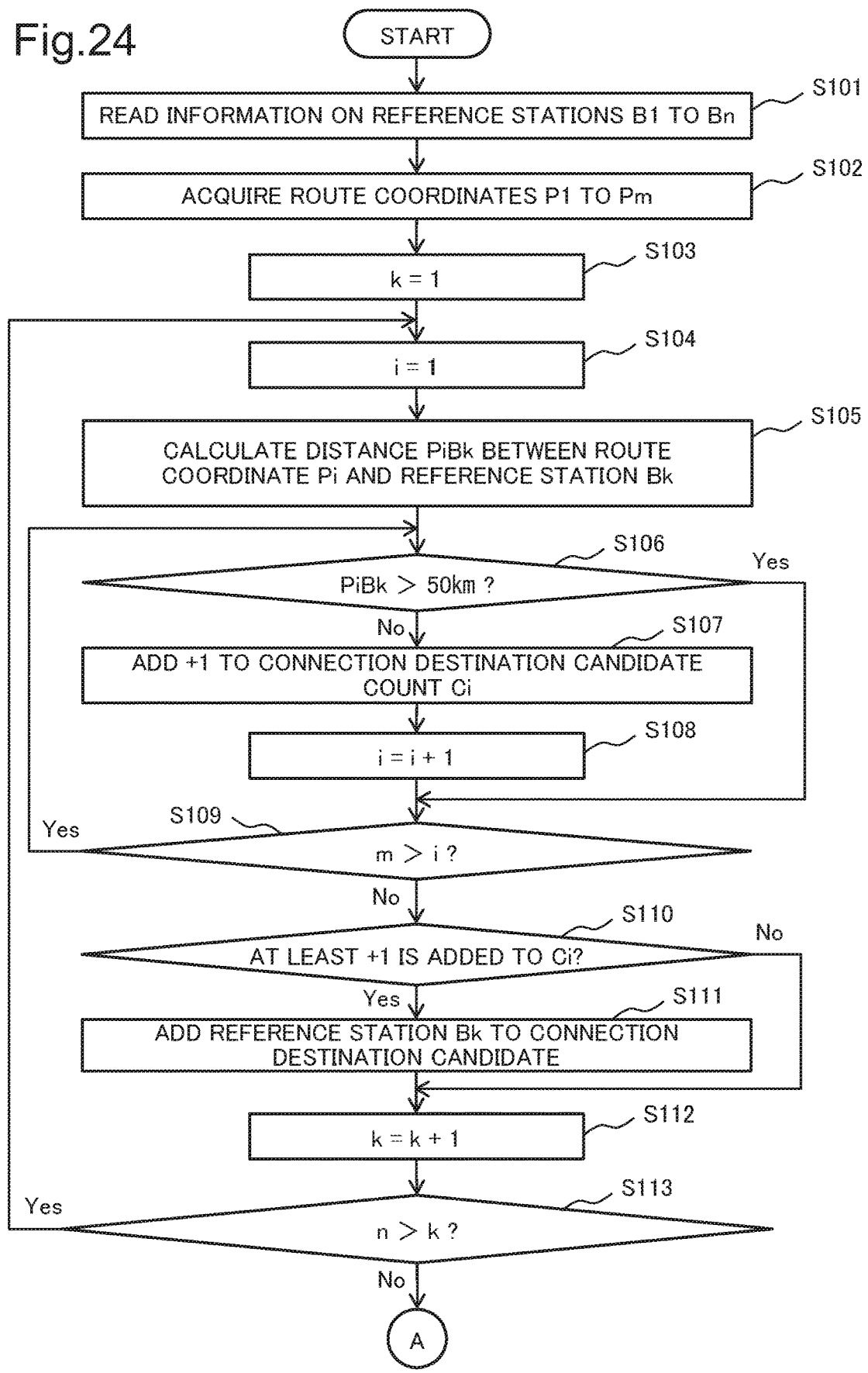
FIG. 24 is a flowchart for describing a connection destination candidate selection process of connection destination determination processing in an application example of the position measuring system according to the fourth example embodiment of the present invention.
Figure 25:
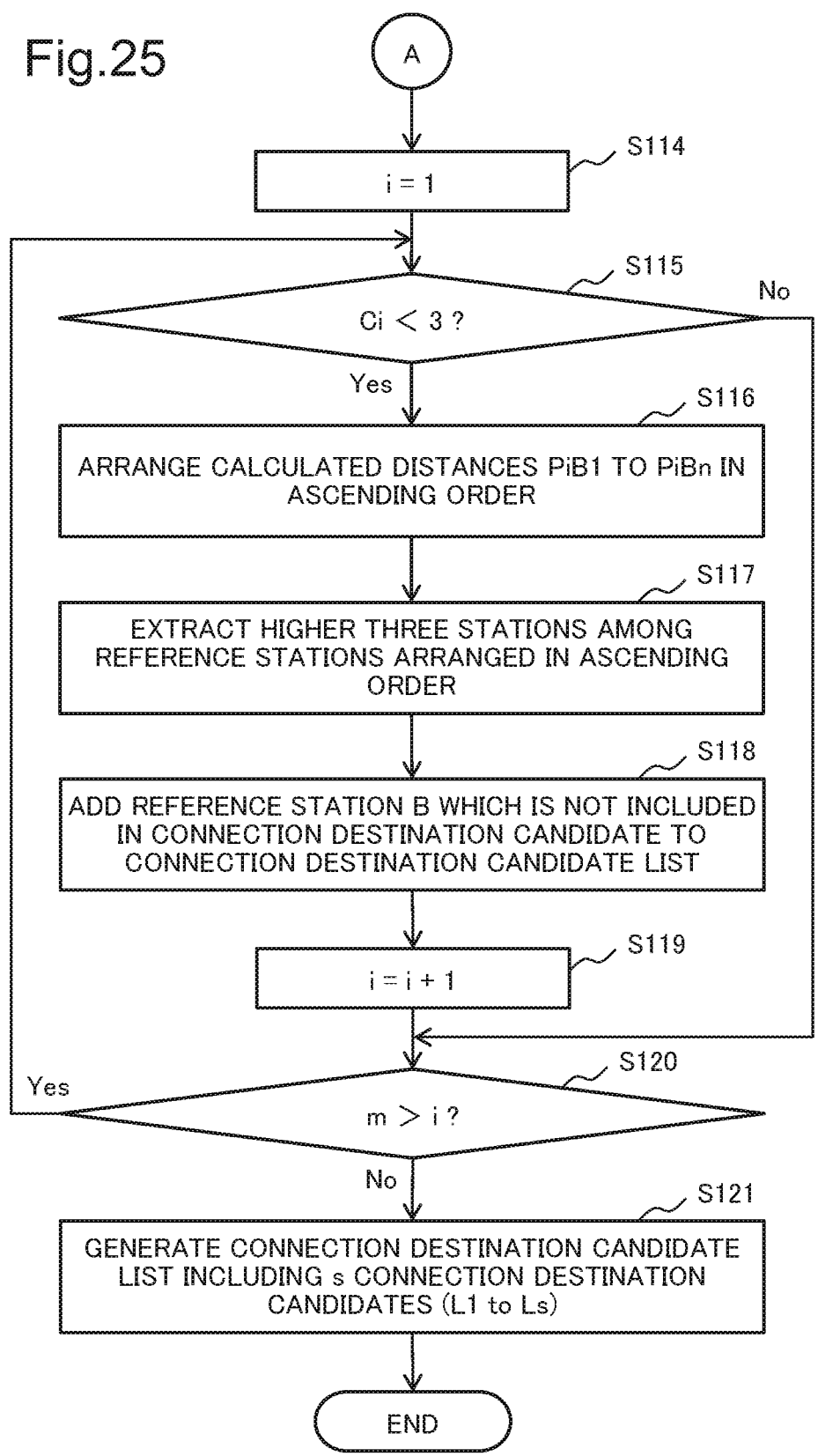
FIG. 25 is a flowchart for describing the connection destination candidate selection process of the connection destination determination processing in the application example of the position measuring system according to the fourth example embodiment of the present invention.
Figure 26:
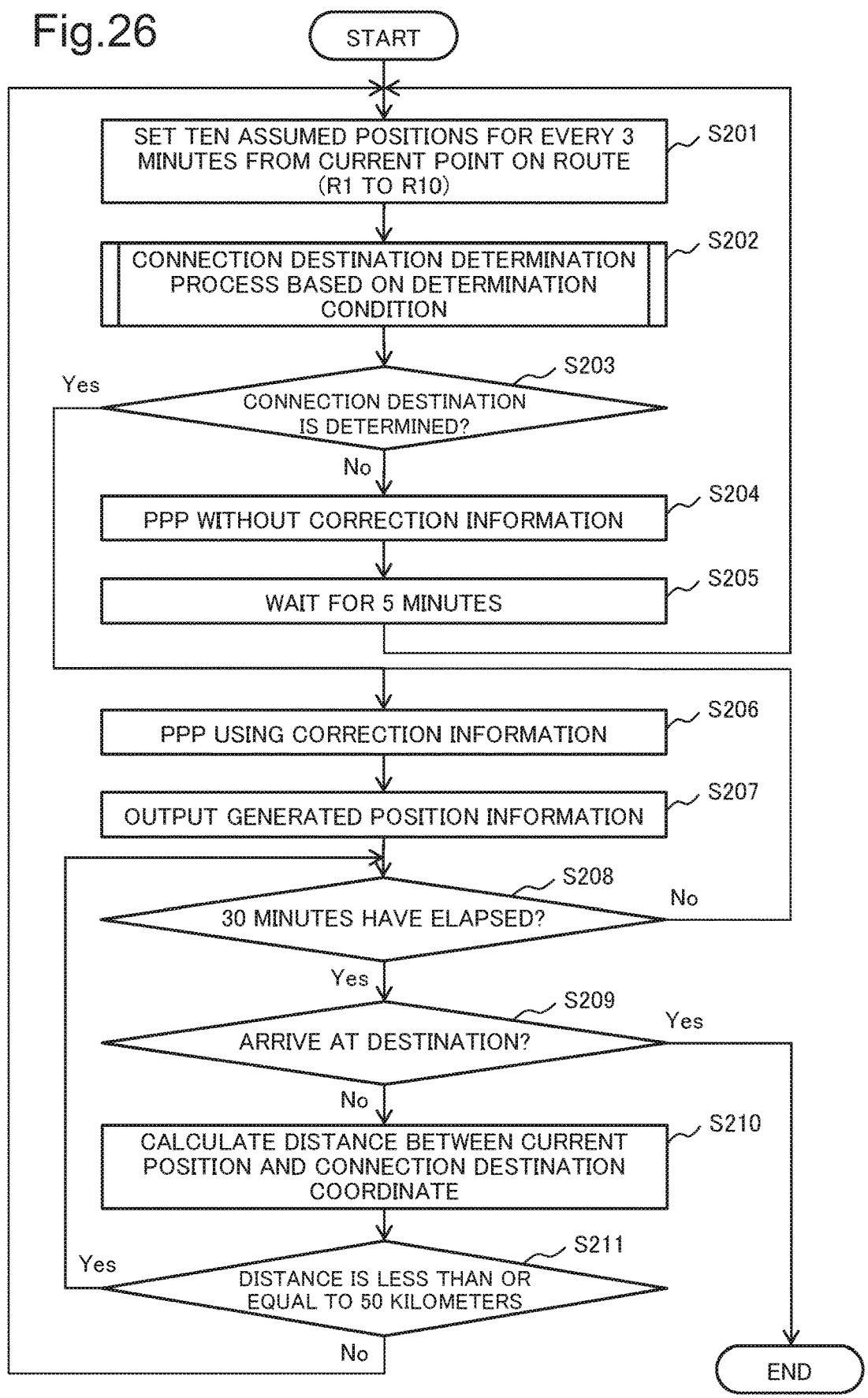
FIG. 26 is a flowchart for describing a part of the connection destination determination processing and position information generation processing in the application example of the position measuring system according to the fourth example embodiment of the present invention.
Figure 27:
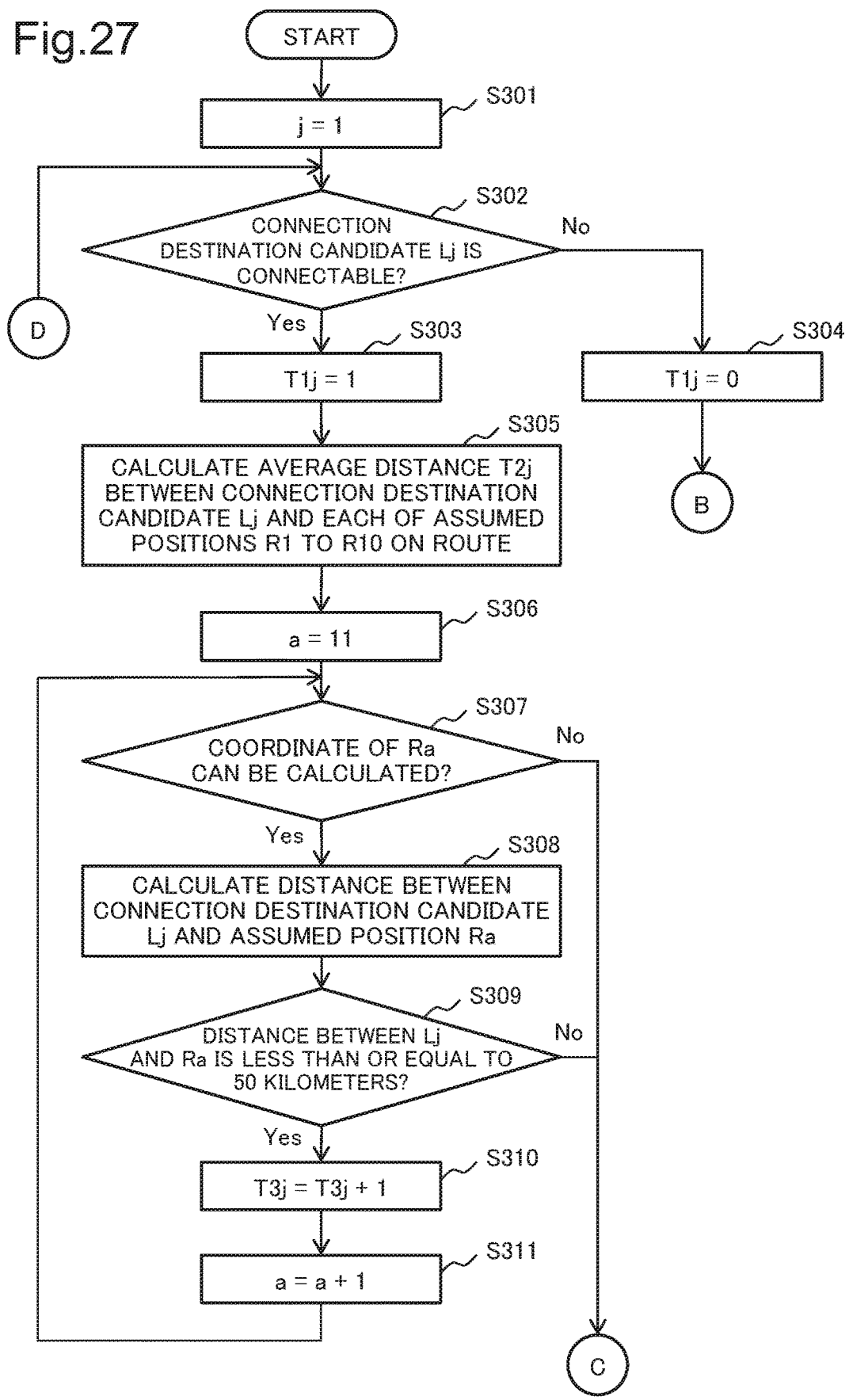
FIG. 27 is a flowchart for describing a connection destination determination process based on a determination condition in the connection destination determination processing in the application example of the position measuring system according to the fourth example embodiment of the present invention.
Figure 28:
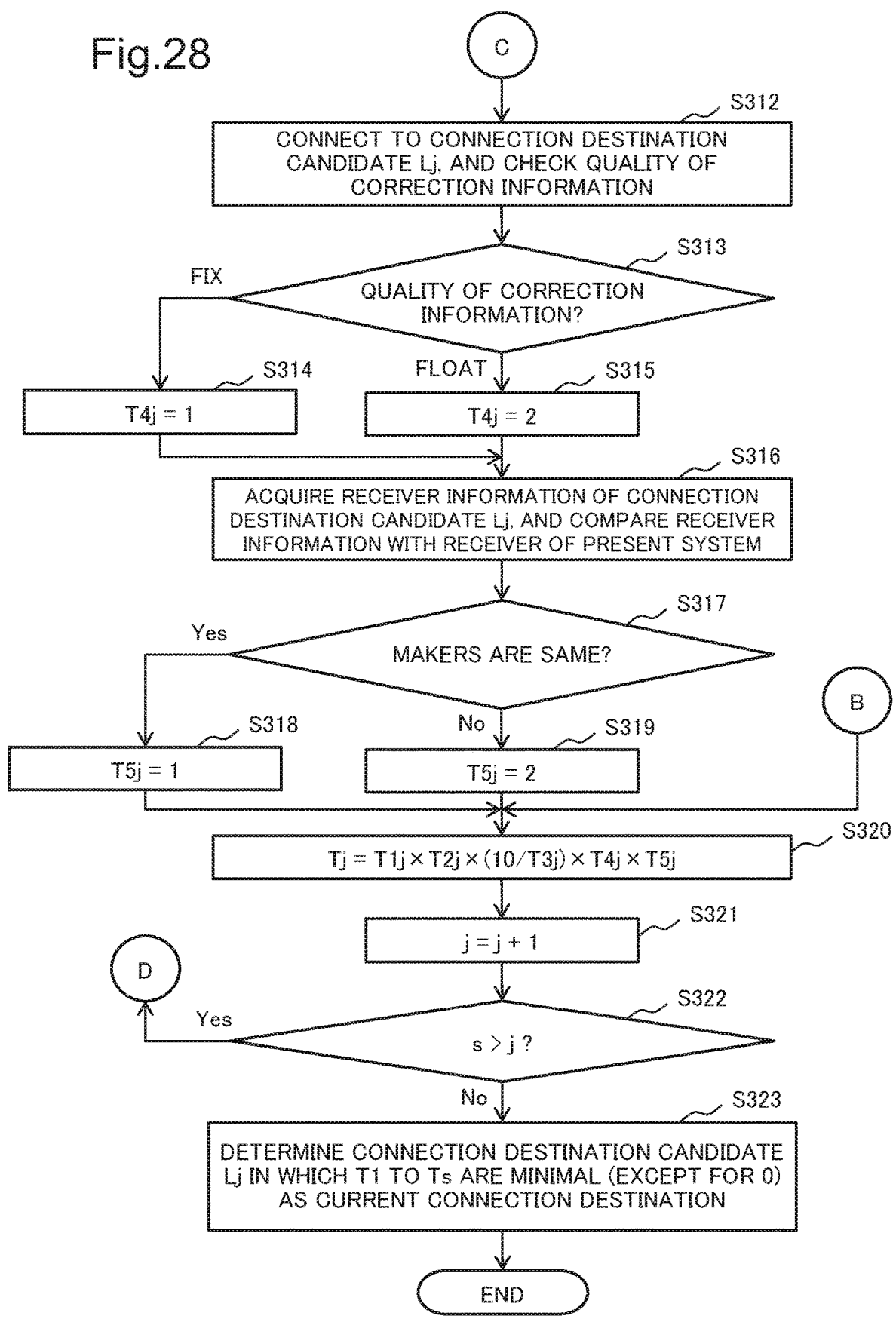
FIG. 28 is a flowchart for describing a connection destination determination process based on a determination condition in the connection destination determination processing in the application example of the position measuring system according to the fourth example embodiment of the present invention.

Next, an application example of the position measuring system according to the fourth example embodiment of the present invention is described along with a flowchart. FIGS. 24 and 25 are flowcharts for describing a connection destination candidate selection process of connection destination determination processing. FIG. 26 is a flowchart for describing a part of the connection destination determination processing and position information generation processing (also referred to as a connection destination automatic switch process). FIGS. 27 and 28 are flowcharts for describing a connection destination determination process based on a determination condition in the connection destination determination processing. In the following description, a connection destination determination device and a position information generation device are designated as subjects of operation, and a description is given by omitting a reference sign of each component.

Connection Destination Candidate Selection Process

First, the connection destination candidate selection process is described along with the flowcharts in FIGS. 24 and 25. In the example of FIGS. 24 and 25, an example is described in which information relating to n reference stations (B1 to Bn) is stored in a reference station list file, and m route coordinates (P1 to Pm) are acquired from a navigation system (m and n: natural numbers). Note that each k-th reference station is denoted as a reference station Bk, and an i-th route coordinate is denoted as a route coordinate Pi. Moreover, the route coordinate Pi is given as a two-dimensional coordinate such as (XPi, YPi), and a distance between the route coordinate Pi and the reference station Bk is denoted as PiBk. Further, a connection destination candidate count representing a number of connection destination candidates is denoted as Ci. In the example of FIGS. 24 and 25, the connection destination determination device generates a connection destination candidate list including s connection destination candidates L1 to Ls (s: natural number).

In FIG. 24, first, the connection destination determination device reads information on n reference stations B1 to Bn from a reference station list file (step S101).

Next, the connection destination determination device acquires m route coordinates P1 to Pm from a current location (a departure location) to a destination from a navigation system (step S102).

Next, the connection destination determination device sets k=1 (step S103).

Next, the connection destination determination device sets i=1 (step S104). Note that orders of the step S103 and the step S104 may be interchanged.

Next, the connection destination determination device calculates a distance PiBk between the route coordinate Pi and the reference station Bk (step S105).

Herein, the connection destination determination device determines whether or not the PiBk exceeds 50 kilometers (step S106).

When the PiBk is less than or equal to 50 kilometers (No in the step S106), the connection destination determination device adds +1 to the connection destination candidate count Ci (step S107). On the other hand, when the PiBk exceeds 50 kilometers (Yes in the step S106), the connection destination determination device advances to a step S109.

Then, the connection destination determination device counts up i by +1 (step S108).

When m is less than or equal to i (No in the step S109), the connection destination determination device determines whether at least +1 is added to the connection destination candidate count Ci (step S110). For example, in a case where an initial value of the connection destination candidate count Ci is 0, the connection destination determination device determines Yes in the step S110 when the connection destination candidate count Ci is equal to or more than 1. On the other hand, when m exceeds i (Yes in the step S109), the connection destination determination device returns to the step S106.

Herein, when at least +1 is added to the connection destination candidate count Ci (Yes in the step S110), the connection destination determination device adds the reference station Bk to a connection destination candidate (step S111). On the other hand, when nothing is added to the connection destination candidate count Ci (No in the step S110), the connection destination determination device advances to a step S112.

Next, the connection destination determination device counts up k by +1 (step S112).

Then, the connection destination determination device determines whether n is greater than k (step S113).

When n is greater than k (Yes in the step S113), the connection destination determination device returns to the step S104. On the other hand, when n is less than or equal to k (No in the step S113), the connection destination determination device advances to a step S114 in FIG. 25 (advances to A in FIG. 24).

In FIG. 25, first, the connection destination determination device sets i=1 (step S114).

Then, the connection destination determination device determines whether or not the connection destination candidate count Ci is less than 3 (step S115).

When the connection destination candidate count Ci is less than 3 (Yes in step S115), the connection destination determination device arranges the calculated distances PiB1 to PiBn in ascending order (step S116). On the other hand, when the connection destination candidate count Ci is equal to or more than 3 (No in the step S115), the connection destination determination device advances to a step S120.

Next, the connection destination determination device extracts higher three stations among the reference stations arranged in ascending order (step S117).

Next, the connection destination determination device adds a reference station B which is not included in a connection destination candidate to a connection destination candidate list (step S118).

Next, the connection destination determination device counts up i by +1 (step S119).

Herein, the connection destination determination device determines whether or not m is greater than i (step S120).

When m is less than or equal to i (No in step S120), the connection destination determination device generates a connection destination list including s connection destination candidates L1 to Ls (step S121). On the other hand, when m exceeds i (Yes in the step S120), the connection destination determination device returns to the step S115.

The above is a description regarding the connection destination candidate selection process along the flowcharts in FIGS. 24 and 25.

Automatic Connection Destination Switch Process

Next, the connection destination automatic switch process is described along with the flowchart in FIG. 26. In relation to the example of FIG. 26, the connection destination determination device and the position information generation device are described as subjects of operation. In the example of FIG. 26, the connection destination determination device determines a current connection destination by setting ten assumed positions (R1 to R10) for every 3 minutes from a current location on a route (steps S201 to S202). Then, the position information generation device calculates position information by use of correction information of the current connection destination (steps S203 to S211).

In FIG. 26, first, the connection destination determination device sets ten assumed positions (R1 to R10) for every 3 minutes from a current location on a route (step S201).

The connection destination determination device determines a connection destination, based on a determination condition (step S202). The process (the connection destination determination process based on the determination condition) in the step S202 will be described later with reference to FIGS. 27 and 28.

Herein, when a connection destination is not determined (No in the step S203), the position information generation device generates current position information by PPP without using correction information (step S204). Then, the position information generation device waits for 5 minutes (step S205), and returns to the step S201.

On the other hand, when a connection destination is determined (Yes in the step S203), the position information generation device generates current position information by PPP by use of correction information of the current connection destination (step S206).

The position information generation device outputs the generated position information (step S207).

When 30 minutes have not elapsed (No in the step S208), the position information generation device returns to the step S206. Then, when 30 minutes have elapsed (Yes in the step S208), the position information generation device determines whether or not a destination is arrived at (step S209). When the destination is not arrived at this point (No in the step S209), the position information generation device calculates a distance between a current connection destination and a current position (step S210). On the other hand, when the destination is arrived at this point (Yes in the step S209), a series of processing along the flowchart in FIG. 26 ends.

When a distance between a current connection destination and a current position is less than or equal to 50 kilometers (Yes in the step S211), the position information generation device returns to the step S208. On the other hand, when a distance between a current connection destination and a current position exceeds 50 kilometers (No in the step S211), the position information generation device returns to a step S201, and then re-determines a connection destination.

The above is a description regarding the connection destination automatic switch process along the flowchart in FIG. 26.

Connection Destination Determination Process Based On Determination Condition

Next, the connection destination determination process based on a determination condition (the step S202 in FIG. 26) is described along with the flowcharts in FIGS. 27 and 28. In the description using FIGS. 27 and 28, a connection destination calculating unit is described as a subject.

In the example of FIGS. 27 and 28, a communication condition value T1j, a distance condition value T2j, a valid period condition value T3j, a correction information quality condition value T4j, and a device condition value T5j are used as parameters of a determination value Tj (j: natural number). Hereinafter, a connection destination candidate is denoted as Lj, and an assumed position on an a-th route is denoted as Ra (a: natural number).

In FIG. 27, first, the connection destination calculating unit sets j=1 (step S301).

Next, the connection destination calculating unit determines whether or not the connection destination candidate Lj is connectable (step S302). When the connection destination candidate Lj is connectable (Yes in the step S302), the connection destination calculating unit sets the communication condition value T1j to 1 (step S303). On the other hand, when the connection destination candidate Lj is not connectable (No in the step S302), the connection destination calculating unit sets the communication condition value T1j to 0 (step S304), and advances to a step S320 in FIG. 28 (advances to B in FIG. 27).

Next, the connection destination calculating unit calculates an average distance between the connection destination candidate Lj and each of the assumed positions R1 to R10 on the route as the distance condition value T2j (step S305).

Next, the connection destination calculating unit sets a=1 (step S306).

Herein, the connection destination calculating unit determines whether or not a coordinate of the assumed position Ra can be calculated (step S307). When the coordinate of the assumed position Ra can be calculated (Yes in the step S307), the connection destination calculating unit calculates a distance between the connection destination candidate Lj and the assumed position Ra on the route (step S308). On the other hand, when the coordinate of the assumed position Ra cannot be calculated (No in the step S307), the connection destination calculating unit advances to a step S312 in FIG. 28 (advances to C in FIG. 27).

Herein, the connection destination calculating unit determines whether or not a distance between the connection destination candidate Lj and the assumed position Ra on the route is less than or equal to 50 kilometers (step S309). When a distance between the connection destination candidate Lj and the assumed position Ra on the route is less than or equal to 50 kilometers (Yes in the step S309), the connection destination calculating unit adds +1 to the valid period condition value T3j (step S310), and counts up a by +1 (step S311). After the count-up, the connection destination calculating unit advances to a step S307. On the other hand, when a distance between the connection destination candidate Lj and the assumed position Ra on the route exceeds 50 kilometers (No in the step S309), the connection destination calculating unit advances to a step S312 in FIG. 28 (advances to C in FIG. 27).

In FIG. 28, first, the connection destination calculating unit connects to the connection destination candidate Lj, and checks quality of correction information (step S312). When quality of correction information is FIX (FIX in a step S313), the connection destination calculating unit sets the correction information quality condition value T4j to 1 (step S314). On the other hand, when quality of correction information is FLOAT (FLOAT in the step S313), the connection destination calculating unit sets the correction information quality condition value T4j to 2 (step S315).

Next, the connection destination calculating unit acquires receiver information of the connection destination candidate Lj, and compares the receiver information with a receiver (a positioning information receiving unit) of a position generation system (step S316).

When makers of the receivers are the same (Yes in a step S317), the connection destination calculating unit sets the device condition value T5j to 1 (step S318). On the other hand, when makers of the receivers are different (No in the step S317), the connection destination calculating unit sets the device condition value T5j to 2 (step S319).

Then, the connection destination calculating unit calculates the determination value Tj by use of Equation 3 indicated in the fourth example embodiment (step S320).

Next, the connection destination calculating unit counts up j by +1 (step S321).

Herein, when s is less than or equal to j (No in a step S322), the connection destination candidate Lj in which determination values T1 to Ts become minimal except for 0 is determined as a current connection destination (step S323). On the other hand, when s is greater than j (Yes in the step S322), the connection destination calculating unit returns to the step S302 in FIG. 27 (advances to D in FIG. 28).

The above is a description regarding the connection destination determination process based on a determination condition.

Note that the above processing along the flowcharts in FIGS. 24 to 28 is one example of a specific form of processing of the position measuring system according to each example embodiment of the present invention, and does not limit to the scope of the present invention.

Hardware

Figure 29:
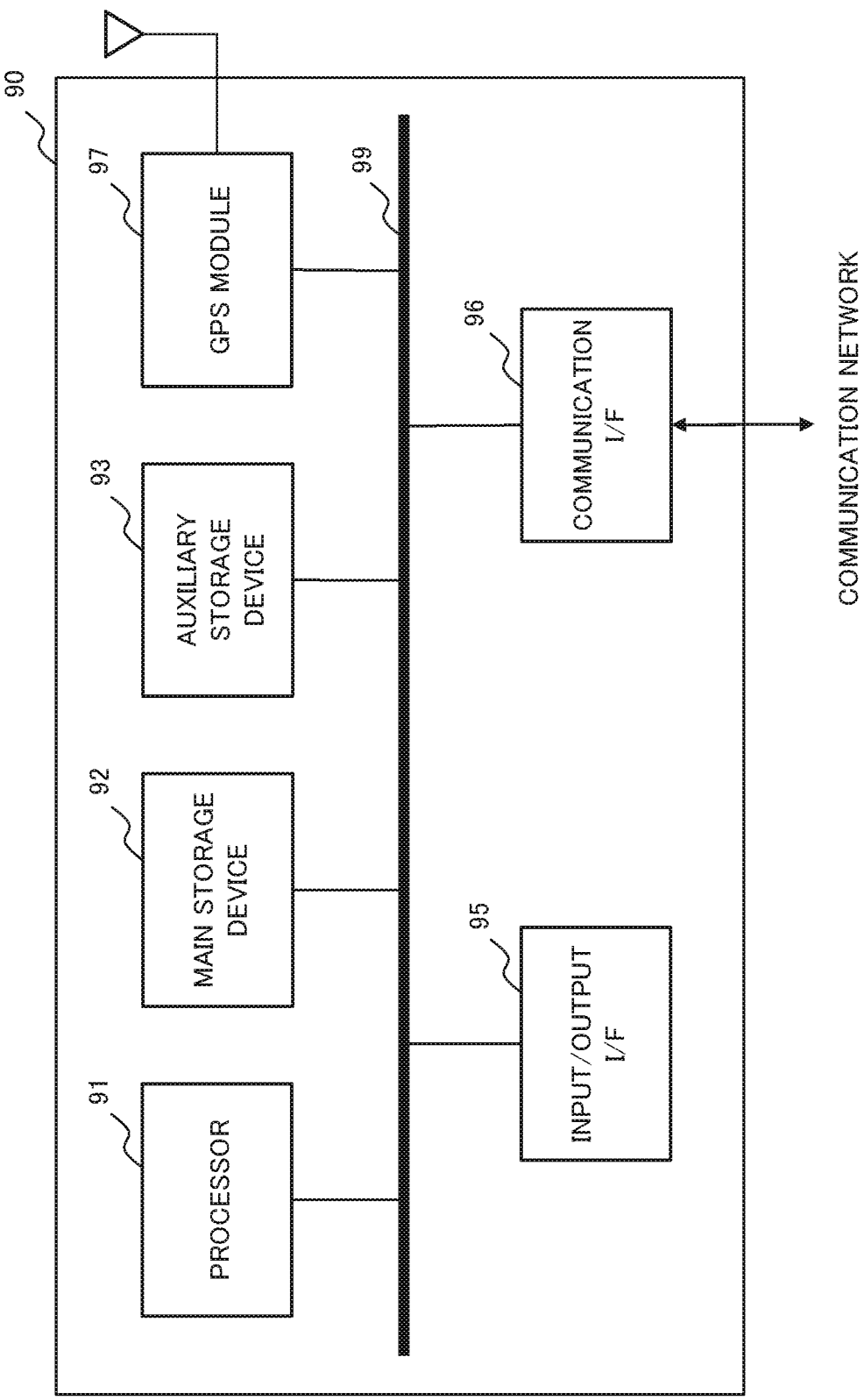
FIG. 29 is a block diagram illustrating one example of a hardware configuration for achieving the position measuring system according to each example embodiment of the present invention.

Herein, a hardware configuration which achieves the position measuring system according to the present example embodiment is described by citing hardware 90 in FIG. 29 as one example. Note that the hardware 90 in FIG. 29 is a configuration example for achieving the position measuring system according to each example embodiment, and does not limit to the scope of the present invention.

As in FIG. 29, the hardware 90 includes a processor 91, a main storage device 92, an auxiliary storage device 93, an input/output interface 95, a communication interface 96, and a GPS module 97. In FIG. 29, an interface is denoted as an I/F for brevity. The processor 91, the main storage device 92, the auxiliary storage device 93, the input/output interface 95, and the communication interface 96 are connected in such a way as to be able to exchange data with one another via a bus 99. Moreover, the processor 91, the main storage device 92, the auxiliary storage device 93, the input/output interface 95, and the GPS module 97 are connected to a network such as the Internet or an intranet via the communication interface 96.

The processor 91 develops, in the main storage device 92, a program stored in the auxiliary storage device 93 or the like, and executes the developed program. In the present example embodiment, a configuration using a software program installed on the hardware 90 may be provided. The processor 91 executes calculation processing and control processing by the position measuring system according to the present example embodiment.

The main storage device 92 has an area where a program is developed. The main storage device 92 may be a non-volatile memory such as a dynamic random access memory (DRAM). Moreover, a non-volatile memory such as a magnetoresistive random access memory (MRAM) may be configured or added as the main storage device 92.

The auxiliary storage device 93 is a means for storing data. The auxiliary storage device 93 is configured by a local disc such as a hard disc or a flash memory. Note that the main storage device 92 may be configured to store data, and the auxiliary storage device 93 may be omitted.

The input/output interface 95 is a device which connects the hardware 90 and peripheral equipment, based on connection standards of the hardware 90 and peripheral equipment. The communication interface 96 is an interface for connecting to a communication network such as the Internet or an intranet, based on a standard or a specification. The input/output interface 95 and the communication interface 96 may be formed into a common interface as an interface which connects to external equipment.

The hardware 90 may be configured in such a way that input equipment such as a keyboard, a mouse, and a touch panel can be connected to the hardware 90 according to need. The input equipment is used for input of information and setting. Note that, when a touch panel is used as input equipment, a display screen of display equipment may be configured to also function as an interface of the input equipment. Data exchange between the processor 91 and input equipment may be mediated by the input/output interface 95.

Moreover, the hardware 90 may be equipped with display equipment for displaying information. When equipped with display equipment, the hardware 90 preferably includes a display control device (not illustrated) for controlling display of the display equipment. The display equipment may be connected to the hardware 90 via the input/output interface 95.

Furthermore, the hardware 90 may be equipped with a reader/writer according to need. For example, the reader/writer is connected to the bus 99. Between the processor 91 and a non-illustrated recording medium (also referred to as a program recording medium), the reader/writer mediates reading of a data program from the recording medium, writing of a processing result of the hardware 90 into the recording medium, and the like. The recording medium can be implemented by a semiconductor recording medium such as a secure digital (SD) card or a universal serial bus (USB) memory. Additionally, the recording medium may be implemented by a magnetic recording medium such as a flexible disc, an optical recording medium such as a compact disc (CD) or a digital versatile disc (DVD), or another recording medium.

The GPS module 97 is a reception device which receives, via an antenna, a radio wave transmitted from an artificial satellite, and demodulates a signal including positioning information from the received radio wave. For example, the GPS module 97 receives radio waves at 1575.42 megahertz (L1 band), 1227.6 megahertz (L2 band), and 1176.5 megahertz (L5 band) transmitted from a plurality of artificial satellites. Note that the GPS module may be set in such a way as to receive a radio wave from an artificial satellite other than a GPS satellite.

When the connection destination determination device and the position information generation device of the position measuring system according to the present example embodiment have different configurations, the connection destination determination device does not have to include the GPS module 97. In this case, the connection destination determination device and the position information generation device may mutually transmit and receive via the communication interfaces 96 of these devices.

While the present invention has been described above with reference to the example embodiments, the present invention is not limited to the above-described example embodiments. Various changes which can be understood by a person skilled in the art can be made to a configuration and details of the present invention within the scope of the present invention.

Some or all of the above-described example embodiments can be also described as follows, but are not limited to the following configuration.

Supplementary Note 1

A position measuring system including:
a connection destination candidate selecting unit which selects a connection destination candidate for each of a plurality of route coordinates on a route included in route information, based on a distance between each of the plurality of route coordinates and each reference station included in a reference station list; and
a connection destination information generating unit which determines a connection destination with correction information being acquired, based on a predetermined determination condition, from among the connection destination candidates selected by the connection destination candidate selecting unit, and generates and then outputs connection destination information relating to the determined connection destination.

Supplementary Note 2

The position measuring system according to supplementary note 1, further including:
a reference station list storage which stores the reference station list;
a reference station list reading unit which reads the reference station list stored in the reference station list storage, and outputs the read reference station list to the connection destination candidate selecting unit;
a route information acquiring unit which acquires the route information from a current location to an assumed arrival location, and outputs the acquired route information to the connection destination candidate selecting unit and the connection destination information generating unit; and
a connection destination candidate list storage which stores a connection destination candidate list collecting the connection destination candidates selected by the connection destination candidate selecting unit.

Supplementary Note 3

The position measuring system according to supplementary note 2, wherein
the connection destination candidate selecting unit includes
an information acquiring unit which acquires the reference station list from the reference station list reading unit, and acquires the route information from the route information acquiring unit,
a distance calculating unit which acquires the reference station list and the route information from the information acquiring unit, and calculates a distance between each of the plurality of route coordinates included in the route information, and the reference station included in the reference station list,
a connection destination candidate count unit which counts the reference stations distances of which from the plurality of route coordinates are within a predetermined range, as the connection destination candidate relating to the plurality of route coordinates,
a connection destination candidate list generating unit which generates the connection destination candidate list by collecting the connection destination candidates counted by the connection destination candidate count unit, stores the generated connection destination candidate list in the connection destination candidate list storage, and outputs an update instruction for the connection destination candidate list,
a connection destination candidate update unit which updates the connection destination candidate list stored in the connection destination candidate list storage in response to the update instruction acquired from the connection destination candidate list generating unit, and outputs the updated connection destination candidate list at a point where a predetermined number of the connection destination candidates are selected with regard to all the route coordinates, and
a connection destination candidate output unit which outputs, to the connection destination information generating unit, the connection destination candidates included in the connection destination candidate list updated by the connection destination candidate update unit.

Supplementary Note 4

The position measuring system according to supplementary note 2 or 3, wherein
the connection destination information generating unit includes
a connection destination candidate acquiring unit which acquires the connection destination candidate output from the connection destination candidate selecting unit,
a route coordinate extracting unit which extracts, as coordinates of estimated relay locations, the plurality of route coordinates from the route from a current point to a location estimated to be arrived at a predetermined time later,
a connection destination calculating unit which calculates a distance between the connection destination candidate acquired by the connection destination candidate acquiring unit and the coordinate of the estimated relay location acquired by the route coordinate extracting unit, calculates a determination value with regard to each of the connection destination candidates, based on the predetermined determination condition, and determines, as the connection destination, the connection destination candidate in which the determination value is minimal, and
a connection destination information output unit which outputs the connection destination information relating to the connection destination determined by the connection destination calculating unit.

Supplementary Note 5

The position measuring system according to supplementary note 4, wherein
the connection destination information generating unit determines the connection destination, based on the predetermined determination condition including a condition of communication with the reference station, and a distance condition relating to a distance between a coordinate of the at least one estimated relay location set on the route and the reference station.

Supplementary Note 6

The position measuring system according to supplementary note 5, wherein
the connection destination information generating unit determines the connection destination, based on the predetermined determination condition including a valid period condition indicating a valid period of the current connection destination on the route exceeding a location estimated to be arrived at a predetermined time later.

Supplementary Note 7

The position measuring system according to supplementary note 4, wherein
the connection destination information generating unit determines the connection destination, based on the predetermined determination condition including a condition of communication with the reference station, a distance condition relating to a distance between a coordinate of the at least one estimated relay location set on the route and the reference station, and a valid period condition indicating a valid period of the current connection destination on the route exceeding a location estimated to be arrived at a predetermined time later.

Supplementary Note 8

The position measuring system according to supplementary note 4 or 5, wherein
the connection destination calculating unit includes
a communication determining unit which outputs a communication condition value indicating a determination result of determining whether or not network connection to the connection destination candidate is possible,
a distance condition value calculating unit which calculates, as a distance condition value, a representing value of a distance between a coordinate of each of the plurality of estimated relay locations and the reference station, and then outputs the distance condition value,
a valid period condition value calculating unit which calculates a valid period condition value indicating a valid period of the current connection destination on the route exceeding the location estimated to be arrived at a predetermined time later, and then outputs the valid period condition value, and
a determination value calculating unit which determines the reference station of the connection destination, based on the communication condition value, the distance condition value, and the valid period condition value.

Supplementary Note 9

The position measuring system according to supplementary note 7 or 8, wherein
the connection destination information generating unit determines the connection destination, based on the predetermined determination condition including a correction information quality condition relating to quality of correction information received from the reference station.

Supplementary Note 10

The position measuring system according to any one of supplementary notes 7 to 9, wherein
the connection destination information generating unit determines the connection destination, based on the predetermined determination condition including a device condition relating to a reception device that receives a signal from an artificial satellite.

Supplementary Note 11

The position measuring system according to supplementary note 8, wherein
the connection destination information generating unit determines the connection destination, based on the predetermined determination condition including a correction information quality condition relating to quality of correction information received from the reference station, and a device condition relating to a reception device that receives a signal from an artificial satellite.

Supplementary Note 12

The position measuring system according to supplementary note 8, wherein
the connection destination calculating unit includes
a correction information quality check unit which outputs a correction information quality condition value relating to quality of the correction information received from the reference station, and
a device condition check unit which outputs a device condition value relating to a reception device that receives a signal from an artificial satellite.

Supplementary Note 13

The position measuring system according to any one of supplementary notes 1 to 12, further including a route information storage which stores the route information.

Supplementary Note 14

The position measuring system according to any one of supplementary notes 1 to 13, further including:
a positioning information receiving unit which receives a radio wave transmitted from an artificial satellite, and demodulates a signal including positioning information of the artificial satellite from a received radio wave;
a correction information receiving unit which receives a signal transmitted from the reference station set to the connection destination at a current point, and demodulates a signal including the correction information from a received signal; and
a position information calculating unit which acquires the positioning information from the positioning information receiving unit and also acquires the correction information from the correction information receiving unit, calculates position information by precise point positioning, by using the acquired positioning information and correction information, and outputs the calculated position information.

Supplementary Note 15

A position measuring method including:
selecting a connection destination candidate for each of a plurality of route coordinates on a route included in route information, based on a distance between each of the plurality of route coordinates and each reference station included in a reference station list;
determining a connection destination with correction information being acquired, based on a predetermined determination condition, from among the selected connection destination candidates;
generating connection destination information relating to the determined connection destination; and
outputting the generated connection destination information.

Supplementary Note 16

A program causing a computer to execute:
processing of selecting a connection destination candidate for each of a plurality of route coordinates on a route included in route information, based on a distance between each of the plurality of route coordinates and each reference station included in a reference station list;
processing of determining a connection destination with correction information being acquired, based on a predetermined determination condition, from among the selected connection destination candidates;
processing of generating connection destination information relating to the determined connection destination; and
processing of outputting the generated connection destination information.

This application is based upon and claims the benefit of priority from Japanese Patent Application No. 2017-046942, filed on Mar. 13, 2017, the disclosure of which is incorporated herein in its entirety by reference.

REFERENCE SIGNS LIST 1, 2 Position measuring system
10 Connection destination determination device
11 Reference station list reading unit
12 Reference station list storage
13 Route information acquiring unit
14 Connection destination candidate selecting unit
15 Connection destination candidate list storage
16 Connection destination information generating unit
17 Route information storage
20 Position information generation device
21 Positioning information receiving unit
22 Antenna
23 Correction information receiving unit
25 Position information calculating unit
41 Information acquiring unit
42 Distance calculating unit
43 Connection destination candidate count unit
44 Connection destination candidate list generating unit
45 Connection destination candidate update unit
46 Connection destination candidate output unit
61 Connection destination candidate acquiring unit
62 Route coordinate extracting unit
63 Connection destination calculating unit
64 Connection destination information output unit
210 Reference station
211 Antenna
212 Receiver
213 Control device
214 Communication device
216 Power source
631 Communication determining unit
632 Distance condition value calculating unit
633 Valid period condition value calculating unit
634 Determination value calculating unit
635 Correction information quality check unit
636 Device condition check unit

The invention claimed is:
1. A position measuring system that calculates positioning information for car navigation by using correction information transmitted by a reference station, the system comprising:
at least one memory storing instructions;
a reference station list storage configured to store a reference station list;
a connection destination candidate list storage configured to store a connection destination candidate list; and
at least one processor connected to the at least one memory, reference station list storage, and connection destination candidate storage, and configured to execute the instructions to:
read the reference station list stored in the reference station list storage;
acquire route information from a current location to an assumed arrival location;
calculate a distance between each of a plurality of route coordinates included in the route information and each of the reference stations included in the reference station list;
select at least one connection destination candidate among the reference stations for each of the plurality of route coordinates, based on the calculated distances;
wherein selecting the at least one connection destination comprises selecting reference stations distances of which from the plurality of route coordinates are within a predetermined range, as connection destination candidates relating to the plurality of route coordinates;
generate the connection destination candidate list by collecting the selected connection destination candidates;
store the generated connection destination candidate list in the connection destination candidate list storage;
receive a radio wave transmitted from an artificial satellite;
demodulate a signal including positioning information of the artificial satellite from the radio wave that has been received from the artificial satellite;
determine a connection destination from which to acquire correction information at a current point, based on a predetermined determination condition, from among the selected connection destination candidates in the connection destination candidate list;
generate connection destination information relating to the determined connection destination;
receive a signal transmitted from the reference station set to the connection destination at the current point;
demodulate a signal including the correction information from the signal that has been received from the reference station set to the connection destination at the current point;
calculate the positioning information by precise point positioning, by using the positioning information of the artificial satellite and the correction information; and
output the calculated positioning information;
wherein the at least one processor is further configured to:
output an update instruction for the connection destination candidate list;
update the connection destination candidate list stored in the connection destination candidate list storage in response to the update instruction;
output the updated connection destination candidate list at a point where a predetermined number of the connection destination candidates are selected with regard to all the route coordinates; and
output the connection destination candidates included in the updated connection destination candidate list.
2. The position measuring system according to claim 1, wherein the at least one processor is configured to execute the instructions to:

extract, as coordinates of estimated relay locations, the plurality of route coordinates from the route from a current point to a location estimated to be arrived at a predetermined time later;

calculate a distance between each of the plurality of selected connection destination candidates and each of the plurality of coordinates of the estimated relay locations;

calculate a determination value with regard to each of the connection destination candidates, based on the predetermined determination condition;

determine, as the connection destination, the connection destination candidate in which the determination value is minimal; and output the connection destination information relating to the determined connection destination.

3. The position measuring system according to claim 2, wherein the at least one processor is configured to execute the instruction to determine the connection destination, based on the predetermined determination condition including a condition of communication with the reference station, and a distance condition relating to a distance between a coordinate of the at least one estimated relay location set on the route and the reference station.

4. The position measuring system according to claim 3, wherein the at least one processor is configured to execute the instruction to determine the connection destination, based on the predetermined determination condition including a valid period condition indicating an effective range of coverage of the current connection destination on the route beyond a location estimated to be arrived after a predetermined time later.

5. The position measuring system according to claim 2, wherein the at least one processor is configured to execute the instruction to determine the connection destination, based on the predetermined determination condition including a condition of communication with the reference station, a distance condition relating to a distance between a coordinate of the at least one estimated relay location set on the route and the reference station, and a valid period condition indicating an effective range of coverage of the current connection destination on the route beyond a location estimated to be arrived after a predetermined time later.

6. The position measuring system according to claim 2, wherein the at least one processor is configured to execute the instructions to:

output a communication condition value indicating a determination result of determining whether or not network connection to the connection destination candidate is possible;

calculate, as a distance condition value, a representing value of a distance between a coordinate of each of the plurality of estimated relay locations and the reference station;

calculate a valid period condition value indicating an effective range of coverage of the current connection destination on the route beyond the location estimated to be arrived after a predetermined time later; and determine the reference station of the connection destination, based on the communication condition value, the distance condition value, and the valid period condition value.

7. The position measuring system according to claim 5, wherein the at least one processor is configured to execute the instruction to determine the connection destination, based on the predetermined determination condition including a correction information quality condition relating to quality of correction information received from the reference station.

8. The position measuring system according to claim 5, wherein the at least one processor is configured to execute the instruction to determine the connection destination, based on the predetermined determination condition including a device condition relating to a reception device that receives a signal from an artificial satellite.

9. The position measuring system according to claim 6, wherein the at least one processor is configured to execute the instruction to determine the connection destination, based on the predetermined determination condition including a correction information quality condition relating to quality of correction information received from the reference station, and a device condition relating to a reception device that receives a signal from an artificial satellite.

10. The position measuring system according to claim 6, wherein the at least one processor is configured to execute the instructions to:

output a correction information quality condition value relating to quality of the correction information received from the reference-station; and output a device condition value relating to a reception device that receives a signal from an artificial satellite.

11. The position measuring system according to claim 1, further comprising a route information storage configured to store the route information.

12. A position measuring method for calculating positioning information for car navigation by using correction information transmitted by a reference station, the method comprising:

reading a reference station list stored in a reference station list storage;

acquiring route information from a current location to an assumed arrival location;

calculating a distance between each of a plurality of route coordinates included in the route information and each of the reference stations included in the reference station list;

selecting at least one connection destination candidate among the reference stations for each of the plurality of route coordinates, based on the calculated distances;

wherein selecting the at least one connection destination candidate comprises selecting reference stations distances of which from the plurality of route coordinates are within a predetermined range, as the at least one connection destination candidate;

generating a connection destination candidate list by collecting the selected connection destination candidates;

storing the generated connection destination candidate list in a connection destination candidate list storage;

receiving a radio wave transmitted from an artificial satellite;

demodulating a signal including positioning information of the artificial satellite from the radio wave that has been received from the artificial satellite;

determining a connection destination from which to acquire correction information at a current point, based on a predetermined determination condition, from among the selected connection destination candidates in the connection destination candidate list;

generating connection destination information relating to the determined connection destination;

receiving a signal transmitted from the reference station set to the connection destination at the current point;

demodulating a signal including the correction information from the signal that has been received from the reference station set to the connection destination at the current point;

calculating the positioning information by precise point positioning, by using the positioning information of the artificial satellite and the correction information; and outputting the calculated positioning information;

wherein the method further comprises:

outputting an update instruction for the connection destination candidate list;

updating the connection destination candidate list stored in the connection destination candidate list storage in response to the update instruction;

outputting the updated connection destination candidate list at a point where a predetermined number of the connection destination candidates are selected with regard to all the route coordinates; and outputting the connection destination candidates included in the updated connection destination candidate list.

13. A non-transitory program recording medium recording a program for calculating positioning information for car navigation by using correction information transmitted by a reference station, the program causing a computer to execute:

processing of reading a reference station list stored in a reference station list storage;

processing of acquiring route information from a current location to an assumed arrival location;

processing of calculating a distance between each of a plurality of route coordinates included in the route information and each of the reference stations included in the reference station list;

processing of selecting at least one connection destination candidate among the plurality of reference stations for each of the plurality of route coordinates, based on the calculated distances;

wherein the processing of selecting the at least one connection destination candidate comprises selecting reference stations distances of which from the plurality of route coordinates are within a predetermined range, as connection destination candidates relating to the plurality of route coordinates;

processing of generating a connection destination candidate list by collecting the selected connection destination candidates;

processing of storing the generated connection destination candidate list in a connection destination candidate list storage;

processing of receiving a radio wave transmitted from an artificial satellite;

processing of demodulating a signal including positioning information of the artificial satellite from the radio wave that has been received from the artificial satellite;

processing of determining a connection destination from which to acquire the correction information at a current point, based on a predetermined determination condition, from among the selected connection destination candidates in the connection destination candidate list;

processing of generating connection destination information relating to the determined connection destination;

processing of receiving a signal transmitted from the reference station set to the connection destination at the current point;

processing of demodulating a signal including the correction information from the signal that has been received from the reference station set to the connection destination at the current point;

processing of calculating the positioning information by precise point positioning, by using the positioning information of the artificial satellite and the correction information;

processing of outputting the calculated positioning information;

wherein the program further causes the computer to execute:

processing of outputting an update instruction for the connection destination candidate list;

processing of updating the connection destination candidate list stored in the connection destination candidate list storage in response to the update instruction;

processing of outputting the updated connection destination candidate list at a point where a predetermined number of the connection destination candidates are selected with regard to all the route coordinates; and processing of outputting the connection destination candidates included in the updated connection destination candidate list.

* * * * *